United States Patent
Mehta et al.

(10) Patent No.: US 9,606,896 B2
(45) Date of Patent: *Mar. 28, 2017

(54) CREATING SEARCHABLE AND GLOBAL DATABASE OF USER VISIBLE PROCESS TRACES

(71) Applicant: Juniper Networks, Inc., Sunnyvale, CA (US)

(72) Inventors: Anish Mehta, Fremont, CA (US); Megh Bhatt, Dublin, CA (US); Rajashekar Reddy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,054

(22) Filed: Aug. 3, 2015

(65) Prior Publication Data

US 2015/0339212 A1 Nov. 26, 2015

Related U.S. Application Data

(63) Continuation of application No. 13/835,483, filed on Mar. 15, 2013, now Pat. No. 9,100,289.

(Continued)

(51) Int. Cl.
*H04L 12/26* (2006.01)
*H04L 12/24* (2006.01)
(Continued)

(52) U.S. Cl.
CPC ...... *G06F 11/3636* (2013.01); *G06F 9/45558* (2013.01); *G06F 11/366* (2013.01); *G06F 17/30289* (2013.01); *H04L 41/065* (2013.01); *H04L 43/06* (2013.01); *H04L 43/0817* (2013.01); *H04L 67/10* (2013.01); *G06F 2009/45595* (2013.01)

(58) Field of Classification Search
CPC ... H04L 49/70; H04L 12/5696; H04L 45/586; H04L 43/06; G06F 11/07; G06F 15/17312; G06F 11/366; G06F 2209/45595

See application file for complete search history.

(56) References Cited

U.S. PATENT DOCUMENTS 5,307,484 A * 4/1994 Baker ............... G06F 17/30312
6,332,163 B1 12/2001 Bowman-Amuah
(Continued)

OTHER PUBLICATIONS

Examination Report from counterpart European Application No. 13170817.4, dated Feb. 2, 2016, 6 pp.

(Continued)

*Primary Examiner* — Sargon Nano
(74) *Attorney, Agent, or Firm* — Shumaker & Sieffert, P.A.

(57) ABSTRACT

In one example, a controller device includes one or more network interfaces communicatively coupled to one or more devices of a virtual network, and a processor configured to determine, for the virtual network, a set of two or more related processes executed by respective devices in the virtual network, receive via the network interfaces data for the set of two or more related processes, and aggregate the data for the set of two or more related processes to form aggregated data for the set of two or more related processes.

20 Claims, 10 Drawing Sheets

Related U.S. Application Data

(60) Provisional application No. 61/729,474, filed on Nov. 23, 2012, provisional application No. 61/723,684, filed on Nov. 7, 2012, provisional application No. 61/723,685, filed on Nov. 7, 2012, provisional application No. 61/721,979, filed on Nov. 2, 2012, provisional application No. 61/721,994, filed on Nov. 2, 2012.

(51) Int. Cl.
*G06F 11/36* (2006.01)
*G06F 17/30* (2006.01)
*G06F 9/455* (2006.01)
*H04L 29/08* (2006.01)

(56) References Cited

U.S. PATENT DOCUMENTS

| | | | |
|---|---|---|---|
| 6,609,051 B2 * | 8/2003 | Fiechter | G06F 11/2263 700/31 |
| 6,904,434 B1 * | 6/2005 | Wallach | G06F 19/363 707/610 |
| 7,130,885 B2 | 10/2006 | Chandra et al. | |
| 7,184,437 B1 | 2/2007 | Cole et al. | |
| 7,260,623 B2 | 8/2007 | Wookey et al. | |
| 7,529,180 B1 * | 5/2009 | Karl | H04L 45/02 370/216 |
| 7,561,571 B1 | 7/2009 | Lovett et al. | |
| 7,562,110 B2 | 7/2009 | Miloushev et al. | |
| 7,685,281 B1 | 3/2010 | Saraiya et al. | |
| 7,756,870 B2 * | 7/2010 | Buchmann | G06Q 10/00 707/736 |
| 7,822,781 B2 | 10/2010 | Greene et al. | |
| 7,860,097 B1 | 12/2010 | Lovett et al. | |
| 7,861,222 B2 * | 12/2010 | Ramsey | G06F 8/314 717/114 |
| 7,949,639 B2 | 5/2011 | Hunt et al. | |
| 7,966,343 B2 * | 6/2011 | Yang | G06F 17/30315 707/791 |
| 8,004,998 B2 * | 8/2011 | Levy | H04L 49/70 370/250 |
| 8,155,125 B1 * | 4/2012 | Borgione | H04L 12/4641 370/395.3 |
| 8,412,549 B2 * | 4/2013 | Graeber | G06Q 10/06 705/7.11 |
| 8,429,630 B2 | 4/2013 | Nickolov et al. | |
| 8,447,851 B1 | 5/2013 | Anderson et al. | |
| 8,463,825 B1 | 6/2013 | Harty et al. | |
| 8,589,338 B2 | 11/2013 | Maes | |
| 8,752,069 B1 * | 6/2014 | Hare | G06Q 10/107 719/313 |
| 8,819,235 B2 * | 8/2014 | Cardona | G06F 9/45558 370/235 |
| 2003/0177187 A1 | 9/2003 | Levine et al. | |
| 2003/0179712 A1 * | 9/2003 | Kobayashi | H04L 5/16 370/249 |
| 2004/0025157 A1 | 2/2004 | Blight et al. | |
| 2004/0181476 A1 | 9/2004 | Smith et al. | |
| 2005/0232256 A1 | 10/2005 | White et al. | |
| 2006/0039384 A1 | 2/2006 | Dontu et al. | |
| 2007/0127489 A1 | 6/2007 | Amaya et al. | |
| 2007/0211731 A1 | 9/2007 | Balandin et al. | |
| 2008/0114571 A1 | 5/2008 | Campbell et al. | |
| 2010/0057649 A1 | 3/2010 | Lee et al. | |
| 2011/0103396 A1 | 5/2011 | Cardona et al. | |
| 2011/0227754 A1 | 9/2011 | Hill | |
| 2011/0274114 A1 | 11/2011 | Dhar et al. | |
| 2012/0051229 A1 | 3/2012 | Feldmann et al. | |
| 2013/0016719 A1 * | 1/2013 | Johnsen | H04L 12/1863 370/390 |

OTHER PUBLICATIONS

Response to Examination Report, dated May 29, 2015, from counterpart European Application No. 13170817.4, filed Sep. 28, 2015, 8 pp.

"Amazon CloudWatch Developer Guide API Version Aug. 1, 2010," Amazon Web Services LLC, Aug. 1, 2010, 84 pp.

Response to Communication pursuant to Rule 94(3) dated Feb. 2, 2016, from counterpart European Application No. 13170817.4, filed May 27, 2016, 7 pp.

Extended European Search Report from corresponding European Application No. 13170817.4, dated Oct. 8, 2013, 9 pp.

"Amazon CloudWatch Developer Guide API Version 2010-08-01," Amazon Web Services LLC, Aug. 1, 2010, 84 pp.

Handigol et al., "Aster*x: Load-Balancing Web Traffic over Wide-Area Networks," 9th GENI Engineering Conference (GEC9), Nov. 2, 2010, 3 pp.

Response to European Office Action dated Dec. 16, 2013, from European Counterpart Application No. 13170817.4, filed May 29, 2014, 8 pp.

Examination Report from counterpart European Application No. 13170817.4, dated May 29, 2015, 10 pp.

"Amazon Elastic Compute Cloud User Guide," API Version 2011-12-01, Amazon Web Services LLC, Dec. 1, 2011, 445 pp.

Duerig et al., "Getting Started with GENI: A User Tutorial," ACM SIGCOMM Computer Communication Review, vol. 42, No. 1, Jan. 2012, 6 pp.

* cited by examiner

CREATING SEARCHABLE AND GLOBAL DATABASE OF USER VISIBLE PROCESS TRACES

This application is a continuation of U.S. application Ser. No. 13/835,483, filed Mar. 15, 2013, which claims the benefit of U.S. Provisional Application No. 61/729,474, filed Nov. 23, 2012, U.S. Provisional Application No. 61/723,684, filed Nov. 7, 2012, U.S. Provisional Application No. 61/723,685, filed Nov. 7, 2012, U.S. Provisional Application No. 61/721,979, filed Nov. 2, 2012, U.S. Provisional Application No. 61/721,994, filed Nov. 2, 2012, the entire contents of each of which are hereby incorporated by reference.

TECHNICAL FIELD

This disclosure generally relates to post-failure debugging of complex software systems.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, this disclosure describes techniques for automatically tracing back from a central location (e.g., by using a structurally-queryable (SQL-able) central database), where the trace-back occurs long after a failure occurred, for thereby identifying likely faulty processes in massively distributed complex systems, such as software defined network (SDN) systems.

In one example, a method includes determining, by a controller device for a virtual network, a set of two or more related processes executed by respective devices in the virtual network, receiving, by the controller device, data for the set of two or more related processes, and aggregating, by the controller device, the data for the set of two or more related processes to form aggregated data for the set of two or more related processes.

In another example, a controller device includes one or more network interfaces communicatively coupled to one or more devices of a virtual network, and a processor configured to determine, for the virtual network, a set of two or more related processes executed by respective devices in the virtual network, receive via the network interfaces data for the set of two or more related processes, and aggregate the data for the set of two or more related processes to form aggregated data for the set of two or more related processes.

In another example, a computer-readable storage medium having stored thereon instructions that, when executed, cause a processor to determine, by a controller device for a virtual network, a set of two or more related processes executed by respective devices in the virtual network, receive, by the controller device, data for the set of two or more related processes, and aggregate, by the controller device, the data for the set of two or more related processes to form aggregated data for the set of two or more related processes.

The details of one or more examples are set forth in the accompanying drawings and the description below. Other features, objects, and advantages will be apparent from the description and drawings, and from the claims.

DETAILED DESCRIPTION

Figure 1:
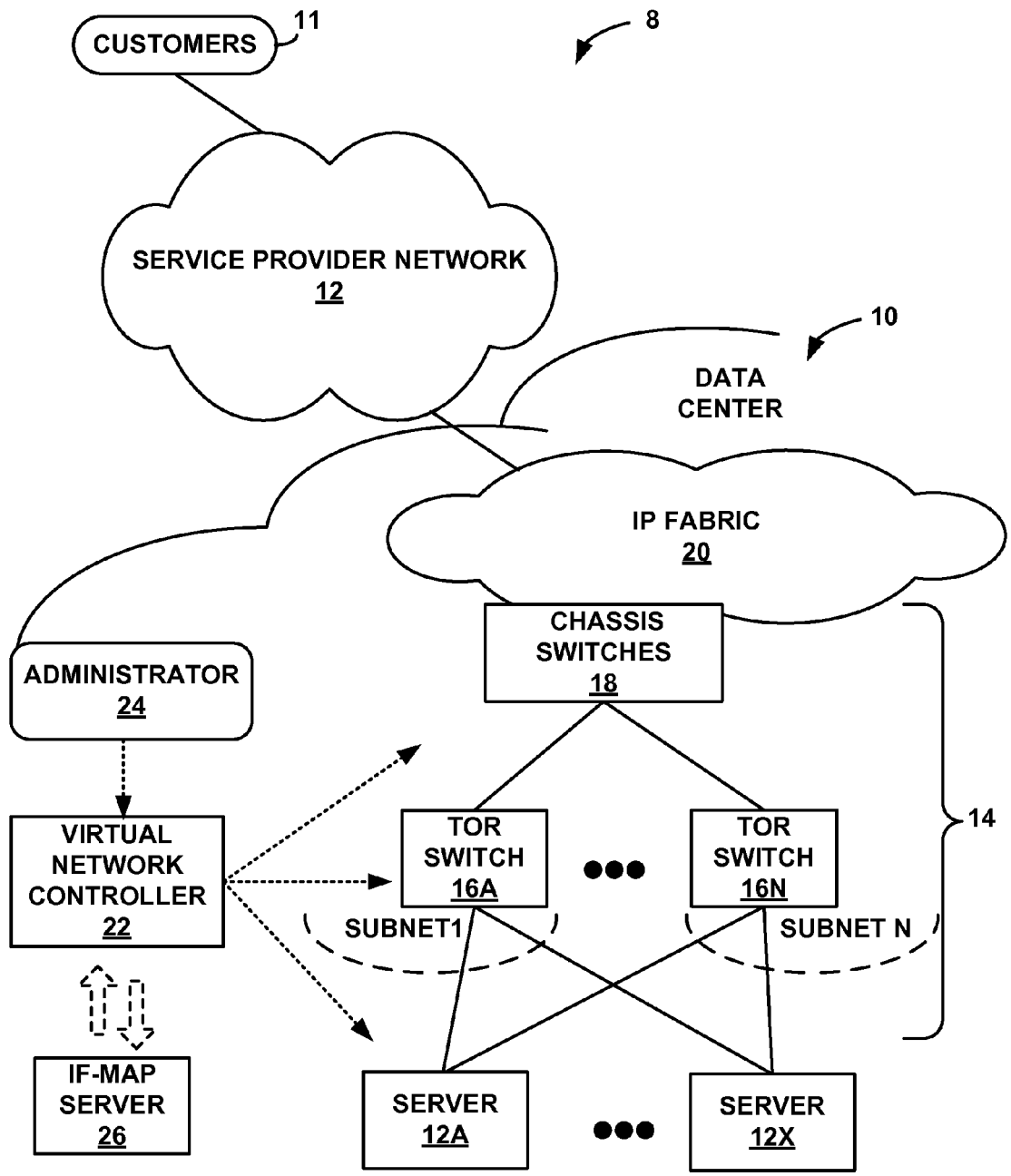
FIG. 1 is a block diagram illustrating an example data center in which examples of the techniques described herein may be implemented.

Faults and failures, in the context of software systems, are not one and the same thing. When a failure happens, it is not always easy to determine who or what was at fault (blameworthy), especially if the failure is discovered long after the fault occurred and especially if the point of fault can be anywhere in a massively distributed system such as in a software defined network (SDN) system.

A simple example of a "fault" might be an attempted division by zero in a math processing part of an executing software process. Ideally, the CPU or other data processing hardware component will issue an exception flag when such a violation of basic math rules is attempted and a corresponding error log will be generated locally for the hardware component and/or software component in which the violation was attempted. Later, when a problem debugging analyst reviews the local log, he/she will spot the exception flag(s) and recognize that a simple math rule violation such as division by zero was attempted.

A slightly more complex example of a "fault" might be a generation of an out-of-range result value in a math processing part of an executing software process. For example, the allowed range for an accounting procurement account might be: not less than $5.00 but not more than $1000.00; where, for some reason, an executed math operation produces a result value such as $4.99 or $1000.01 and the violation is not caught by hardware means. Ideally, the executing software will include a results validation thread, and the latter will issue one or more exception flags when such a violation of non-basic math and application-specific rules is attempted. Thereafter, a corresponding error log may be generated locally for the results validation thread of the local process in which the violation was attempted. Later, when a problem debugging analyst reviews the local log, he/she will spot the exception flag(s) and recognize that one or more application-specific rule violations were attempted. The problem debugging analyst may then formulate corrective code for avoiding recurrence of the violation(s).

These simple examples do not address the question of what happens when a rules violating (or other fault-causing) procedure takes place in a multi-encapsulated computing and/or telecommunications environment, such as that where many virtual machines are respectively executing many distributed processes across a massively distributed system such as a software defined network (SDN) system. In that case, even if an exception log exists, the problem debugging analyst often does not know where in the massively distributed system to look because there are too many possibilities and too many spaced apart locations (e.g., physical servers that are miles apart) in which the fault-indicating log or logs might reside. Moreover, because it may take a long time to realize that a problem occurred, by the time the problem debugging analyst retrospectively begins the query the local exception logs, some of them may have already been overwritten by more recent logs due to memory capacity constraints at given local facilities.

This problem may become particularly acute in systems that are very complex, massive in size (in terms of number of unique components and/or in terms of spatial/geographic extent), and where such systems are expected to be up and running at full capacity as much as possible. An example of such a highly complex, massively sized and full time running system is a software defined networking (SDN) system.

Examples of SDN systems include so-called data-centers (e.g., cloud computing centers) that are used to support operations of the Internet, including data storage, search, and retrieval. Additional details for one SDN example are given below. In brief, and sufficient for the present introduction; an SDN system may be comprised of many thousands of complex server computers (a.k.a. servers programmed to run plural virtual machines and encapsulated processes and sub-processes thereof), many thousands of network channels and routers/switches distributed over many thousands of miles where the expectation of users is that both the complex software and hardware components of such a system will remain failure free and operational on a highly reliable and scalable basis.

It is to be understood that the term, "virtual" as used herein does not mean abstract. Instead it refers to physical means by way of which details of an underlying hardware and/or software system are hidden from a user (encapsulated) and/or by way of which details of an underlying other virtual system are hidden from a user. It is also to be understood that the term, "software" as used herein does not mean software in an abstract sense but rather means a physically real and not ephemerally transient thing which non-abstract, non-ephemerally-transient thing is usable for digitally controlling how a configurable digital data processing system and/or configurable analog signal processing system operates.

In view of the above introductory description as to the difference between simple fault/failures in simple systems, and in view of the above introductory description as to the difference between small simple systems and massively complex and distributed systems that execute hundreds of thousands if not more of processes and sub-processes encapsulated in respectively large numbers of virtual machines and cross-communicated over a vast telecommunications system, it would advantageous to have a method and system for automatically tracing back from a central location and long after a failure occurred, the exception logs that were generated for thereby identifying likely faulty processes in such massively distributed complex systems.

The techniques of this disclosure are generally directed to providing trace back from a central location in a massively distributed, complex system, such as a software defined network (SDN) system.

In one example, a method of identifying likely faulty processes in a massively distributed complex system includes subdividing the system into a plurality of tiers each characterized by having alike components and alike kinds of processes normally executing therein, subdividing system executions as belong to respective ones of a plurality of user-accessible entities such as user-viewable virtual networks (a.k.a. user-viewable VNets, or more generally User-Viewable Entities—UVE's) and assigning a unique identifying key (UVEKey) for each respective UVE of each respective system tier (TRx), of each respective virtual and/or physical execution machine (VOPEM) and of each respective process instance (PIN), tagging corresponding trace logs with two or more of such UVE, TRx and PIN identifying keys (e.g., UVEKey, TRxKey, PINKey, VMKey, PMKey) when the trace is locally generated, transmitting the tagged traces to, and storing them in a centralized database that can be structurally queried with use of one or more of these identifying keys (e.g., UVEKey, TRxKey, PINKey, VMKey, PMKey).

For each respective UVE and tier, the method may include identifying respective process reports that cross correlate with a corresponding UVE Key and a corresponding Tier key where the reports may include quantitative failure or fault parameters such as memory failures, telecommunications failures, processor failures, packet resends and/or drops, etc.) and relaying the UVE and Tier tagged reports to a centralized and query-able database. For each respective process report that is locally generated, automatically tagging the report with one or more linking keys including a UVEKey. For each respective tier, the method may include automatically determining what part of its resources are used by each of respective UVE's and automatically determining if the allocated resources of any UVE are insufficient due to repeated component failures (e.g., lost packets). For each respective UVE and its detected component failures, the method may include logically associating the detected component failures with one or more of the respective captured parameter snapshots that immediately preceded the respective component failures for that UVE.

The method may further include investigating those of the UVE associated reports that were correlated to failure as being likely to point to the at-fault components and/or tiers of that UVE. The method may also include taking preemptive corrective and/or work-around measures for those of the respective tier components and UVEs that were determined to be more highly likely to enter a failure mode based on the investigation.

FIG. 1 is a block diagram illustrating an example network 8 having a data center 10 in which examples of the techniques described herein may be implemented. In general, data center 10 provides an operating environment for applications and services for customers 11 coupled to the data center by service provider network 12. Data center 5 may, for example, host infrastructure equipment, such as networking and storage systems, redundant power supplies, and environmental controls. Service provider network 12 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 10 may be individual network servers, network peers, or otherwise.

In this example, data center 5 includes set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN ("TOR switches" 16) coupled to a distribution layer of chassis switches 18. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 12. Chassis switches 18 aggregates traffic flows and provides high-speed connectivity between TOR switches 16. TOR switches 16A and 16B may be network devices that provide layer 2 (MAC address) and/or layer 3 (IP address) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 using service provider network 12.

Virtual network controller 22 ("VNC") provides a logically centralized controller for facilitating operation of one or more virtual networks within data center 10 in accordance with one or more examples of this disclosure. In some examples, virtual network controller 22 may operate in response to configuration input received from network administrator 24.

In accordance with the techniques of this disclosure, virtual network controller 22 may be configured to aggregate data for a set of two or more related processes, to form aggregated data for the set of two or more related processes.

In particular, virtual network controller 22 may determine the set of two or more related processes executed by respective devices (e.g., servers 12) in a virtual network of data center 10, and receive data for the set of two or more related processes. In general, the set of processes may correspond to a common "tier," e.g., a common network plane, and each of the processes in a particular set may be substantially similar. By executing substantially similar processes on different devices, data center 10 may provide high availability and reduce risk of failure.

More particularly, in accordance with the techniques of this disclosure, computing devices of data center 10, and processes executed by the computing devices, may be divided into various tiers. Within each tier there may be a set of related (e.g., substantially similar) processes. Furthermore, virtual network controller 22 may define User-Visible Entities (UVEs) for the various tiers. The UVEs may define various data for monitoring processes of the various tiers. For example, the UVEs may define attributes of processes to retrieve. Virtual network controller 22 may receive data output during execution of the processes, and in accordance with the UVEs, extract values for the attributes defined by the UVEs. Virtual network controller 22 may further aggregate this data. For example, the UVE may define a manner in which to aggregate certain types of data, corresponding to the attributes, such as addition, union over sets, concatenation, list generation, or the like.

Virtual network controller 22 may then generate one or more reports that are indicative of a tier and aggregated values for one or more attributes corresponding to the tier, as defined by a corresponding UVE. This aggregation can be performed transparently to the devices executing the processes. That is, the devices executing the processes need not take any part in the aggregation. An administrator may use the generated report to diagnose various aspects of the virtual network of data center 10. For example, the report may include data indicative of one or more of a quantitative failure, a fault parameter, a memory failure, a telecommunications failure, a processor failure, a packet resend, and/or a dropped communication session. The administrator may determine, using the report, whether any or all of these conditions apply and act accordingly, e.g., by reprogramming a device of data center 10, replacing a device of data center 10, adding, replacing, or removing links between devices, adding or upgrading software for one or more devices of data center 10, or the like, based on the contents of the report.

In some examples, virtual network controller 22 includes an analytics layer, that is, an intermediate layer that acts on generic rules. The UVEs may define rules in accordance with the analytics layer. Thus, virtual network controller 22 may operate substantially automatically, that is, without user interference, to perform the techniques of this disclosure. The analytics tier may use definitions of the UVEs to extract information from communications output by the devices executing the corresponding processes and aggregate values for certain attributes, as defined by the UVEs, of the communications.

In this manner, virtual network controller 22 represents an example of a controller device configured to determine, for a virtual network, a set of two or more related processes executed by respective devices in the virtual network, receive data for the set of two or more related processes, and aggregate the data for the set of two or more related processes to form aggregated data for the set of two or more related processes.

Figure 2:
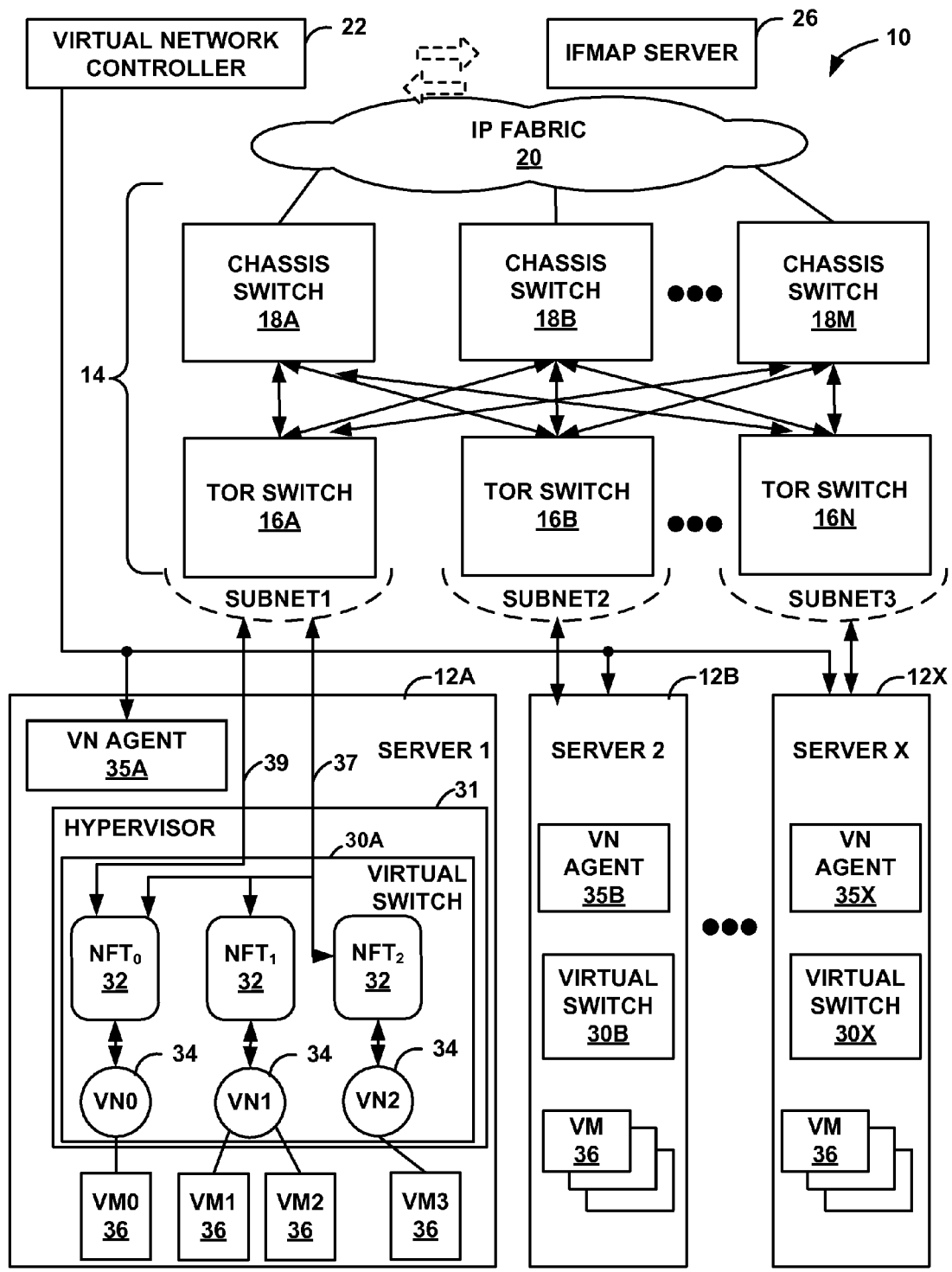
FIG. 2 is a block diagram illustrating in further detail an example system in which the techniques described herein may be implemented.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software switches 30A-30X (also referred to as a "virtual switches). Virtual switches 30 dynamically create and manage one or more virtual networks 34 to be used by applications communicating with application instances. In one example, virtual switches 30 execute the virtual network as an overlay network, which provides the capability to decouple an application's virtual address from a physical address (e.g., IP address) of the one of servers 12A-12X ("servers 12") on which the application is executing. Each virtual network 34 may use its own addressing and security scheme and may be viewed as orthogonal from the physical network and its addressing scheme. Various techniques may be used to transport packets within and across virtual network(s) 34 over the physical network.

Each virtual switch 30 may execute within a hypervisor, a host operating system or other component of each of servers 12. In the example of FIG. 2, virtual switch 30 executes within hypervisor 31, also often referred to as a virtual machine manager (VMM), which provides a virtualization platform that allows multiple operating systems to concurrently run on one of host servers 12. In the example of FIG. 2, virtual switch 30A manages virtual networks 34, each of which provides a network environment for execution of one or more virtual machines (VMs) 36 on top of the virtualization platform provided by hypervisor 31. Each VM 36 is associated with one of the virtual subnets VN0-VN2 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, i.e., server 12A in the example of FIG. 2.

In one implementation, each of servers 12 includes a virtual network agent ("VN agent") 35A-35X ("VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center to create one or more overlay networks. Other example tunneling protocols may be used, including IP over GRE, VxLAN, MPLS over GRE, etc.

As noted above, virtual network controller 22 provides a logically centralized controller for facilitating operation of one or more virtual networks within data center 10. Virtual network controller 22 may, for example, maintain a routing information base, e.g., on or more routing tables that store routing information for the physical network as well as the overlay network of data center 10. Similarly, switches 16, 18 and virtual switches 30 maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with one or more outer IP addresses.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicasting replication. In some cases, virtual network controller 22 maintains the routing information in the form of a radix tree having leaf nodes that represent destinations within the network. U.S. Pat. No. 7,184,437 provides details of an example router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual switch 30 includes a default network forwarding table $NFT_0$ and provides a default route that allows packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual switches 30 may communicate using virtual subnet VN0 in accordance with default network forwarding table $NFT_0$ during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual switches 30 to update their local network forwarding tables 32. For example, virtual network controller 22 may output commands to virtual network agents 35 to update one or more NFTs 32 to direct virtual switches 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information and may issue messages to other virtual network agents 35 to update local routing information stored by the virtual network agents within network forwarding tables 32.

Figure 3:
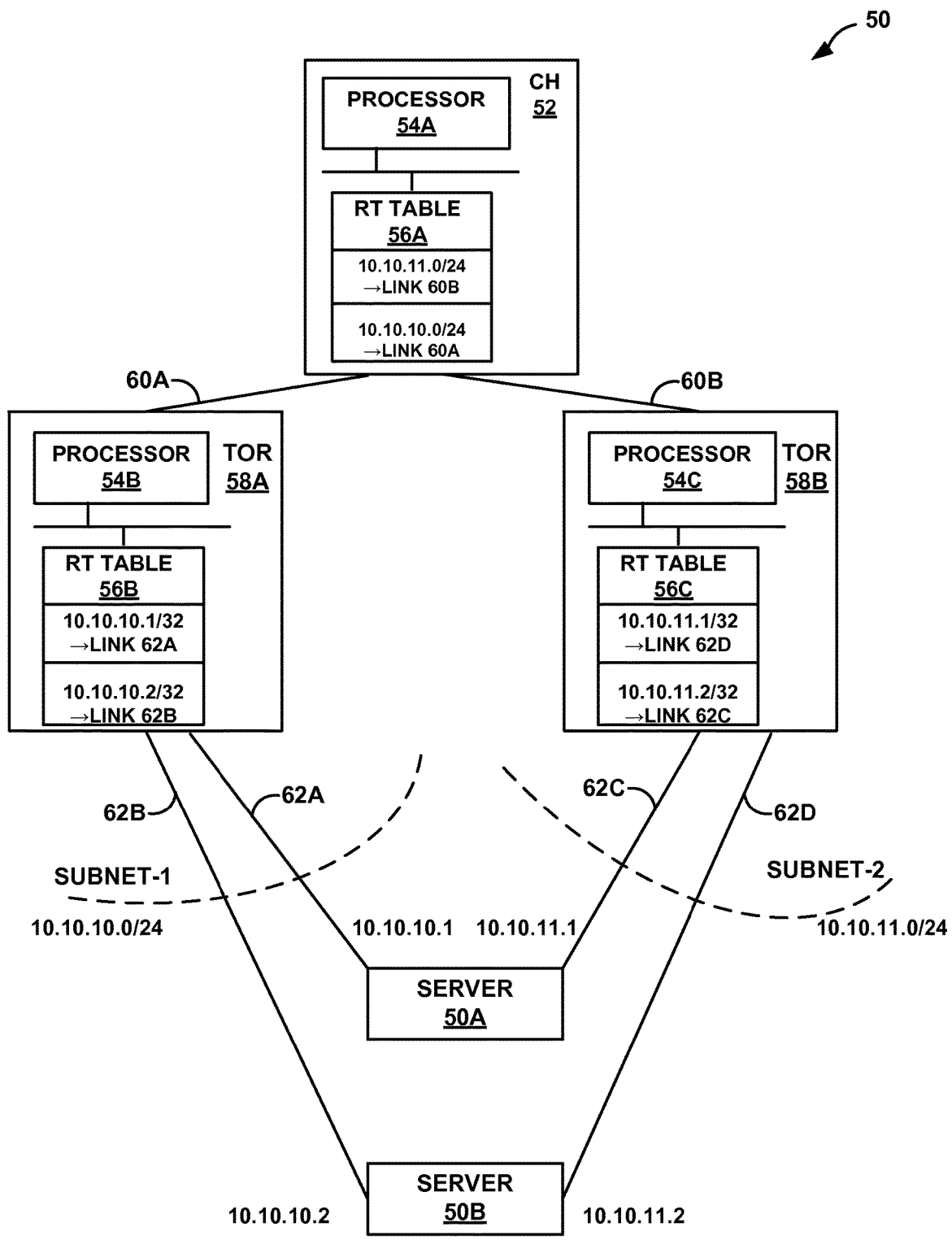
FIG. 3 is another block diagram illustrating an example system 50 illustrating example configuration of chassis switch and TOR switches as described herein.

FIG. 3 is another block diagram illustrating an example system 50 illustrating example configuration of routing information within chassis switch and TOR switches as described herein. System 50 of FIG. 3 may, for example, correspond to portions of data center 10 illustrated in FIGS. 1 and 2.

In this example, chassis switch 52 ("CH 52"), which may be any of chassis switches 18 of FIG. 1, is coupled to Top of Rack (TOR) switches 58A-58B ("TORs 58") by chassis link 60A and chassis link 60B, respectively ("chassis links 60"). TORs 58 may, in some examples, be any of TORs 16 of FIG. 1. In the example of FIG. 3, TORs 58 are also coupled to servers 50A-50B ("servers 50") by TOR links 62A-62D ("TOR links 62"). Servers 50 may be any of servers 12 (FIG. 1). Here, servers 50 communicate with both TORs 58, and can physically reside in either associated rack. TORs 58 each communicate with a number of network switches, including chassis switch 18A.

Chassis switch 18A has a processor 54A in communication with an interface for communication with a network as shown, as well as a bus that connects a memory (not shown) to processor 54A. The memory may store a number of software modules. These modules include software that controls network routing, such as an Open Shortest Path First (OSPF) module (not shown) containing instructions for operating the chassis switch 18A in compliance with the OSPF protocol. Chassis switch 18A maintains routing table ("RT table") 56A containing routing information for packets, which describes a topology of a network. Routing table 56A may be, for example, a table of packet destination Internet protocol (IP) addresses and the corresponding next hop, e.g., expressed as a link to a network component.

TORs 58 each have a respective processor 54B, 54C, an interface in communication with chassis switch 18A, and a memory (not shown). Each memory contains software modules including an OSPF module and routing table 56B, 56C as described above.

TORs 58 and chassis switch 18A may exchange routing information specifying available routes, such as by using a link-state routing protocol such as OSPF or IS-IS. TORs 58 may be configured as owners of different routing subnets. For example, TOR 58A is configured as the owner of Subnet 1, which is the subnet 10.10.10.0/24 in the example of FIG. 2, and TOR 58A is configured as the owner of Subnet 2, which is the subnet 10.10.11.0/24 in the example of FIG. 2. As owners of their respective Subnets, TORs 58 locally store the individual routes for their subnets and need not broadcast all route advertisements up to chassis switch 18A. Instead, in general TORs 58 will only advertise their subnet addresses to chassis switch 18A.

Chassis switch 18A maintains a routing table ("RT table") 56A, which includes routes expressed as subnets reachable by TORs 58, based on route advertisements received from TORs 58. In the example of FIG. 2, RT table 56A stores routes indicating that traffic destined for addresses within the subnet 10.10.11.0/24 can be forwarded on link 60B to TOR 58B, and traffic destined for addresses within the subnet 10.10.10.0/24 can be forwarded on link 60A to TOR 58A.

In typical operation, chassis switch 18A receives Internet Protocol (IP) packets through its network interface, reads the packets' destination IP address, looks up these addresses on routing table 56A to determine the corresponding destination component, and forwards the packets accordingly. For example, if the destination IP address of a received packet is 10.10.0.0, i.e., the address of the subnet of TOR 58A, the routing table of chassis switch 18A indicates that the packet is to be sent to TOR 58A via link 60A, and chassis switch 18A transmits the packet accordingly, ultimately for forwarding to a specific one of the servers 50.

Similarly, each of TORs 58 receives Internet Protocol (IP) packets through its network interface, reads the packets' destination IP address, looks up these addresses on its routing table 56 to determine the corresponding destination component, and forwards the packets according to the result of the lookup.

Figure 4:
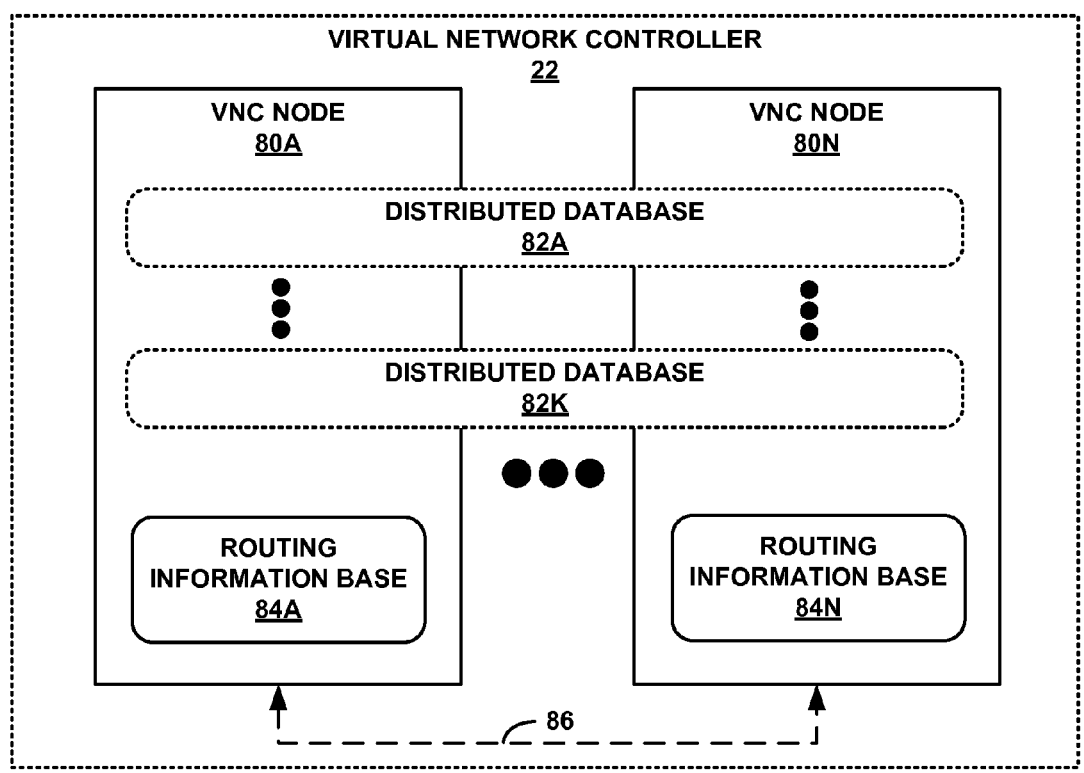
FIG. 4 is a block diagram illustrating an example implementation of a virtual network controller for facilitating operation of one or more virtual networks in accordance with one or more examples of this disclosure.

FIG. 4 is a block diagram illustrating an example implementation of a virtual network controller 22 for facilitating operation of one or more virtual networks in accordance with one or more examples of this disclosure. Virtual network controller 22 may, for example, correspond to virtual network controller 22 of data center 10 of FIGS. 1 and 2.

Virtual network controller (VNC) 22 of FIG. 4 illustrates a distributed implementation of a VNC that includes multiple VNC nodes 80A-80N (collectively, "VNC nodes 80") to execute the functionality of a data center VNC, including managing the operation of virtual switches for one or more virtual networks implemented within the data center. Each of VNC nodes 80 may represent a different server of the data center, e.g., any of servers 12 of FIGS. 1-2, or alternatively, on a server or controller coupled to the IP fabric by, e.g., an edge router of a service provider network or a customer edge device of the data center network. In some instances, some of VNC nodes 80 may execute as separate virtual machines on the same server.

Each of VNC nodes 80 may control a different, non-overlapping set of data center elements, such as servers, individual virtual switches executing within servers, individual interfaces associated with virtual switches, chassis switches, TOR switches, and/or communication links. VNC nodes 80 peer with one another using peering links 86 to exchange information for distributed databases, including distributed databases 82A-82K (collectively, "distributed databases 82"), and routing information (e.g., routes) for routing information bases 84A-84N (collectively, "RIBs 84"). Peering links 86 may represent peering links for a routing protocol, such as a Border Gateway Protocol (BGP) implementation, or another peering protocol by which VNC nodes 80 may coordinate to share information according to a peering relationship.

VNC nodes 80 of VNC 22 include respective RIBs 84 each having, e.g., one or more routing tables that store routing information for the physical network and/or one or more overlay networks of the data center controlled by VNC 22. In some instances, one of RIBs 84, e.g., RIB 84A, may store the complete routing table for any of the virtual networks operating within the data center and controlled by the corresponding VNC node 80 (e.g., VNC node 80A).

In general, distributed databases 82 define the configuration or describe the operation of virtual networks by the data center controlled by distributed VNC 22. For instance, distributes databases 82 may include databases that describe a configuration of one or more virtual networks, the hardware/software configurations and capabilities of data center servers, performance or diagnostic information for one or more virtual networks and/or the underlying physical network, the topology of the underlying physical network including server/chassis switch/TOR switch interfaces and interconnecting links, and so on. Distributed databases 82 may each be implemented using, e.g., a distributed hash table (DHT) to provide a lookup service for key/value pairs of the distributed database stored by different VNC nodes 22.

Figure 5:
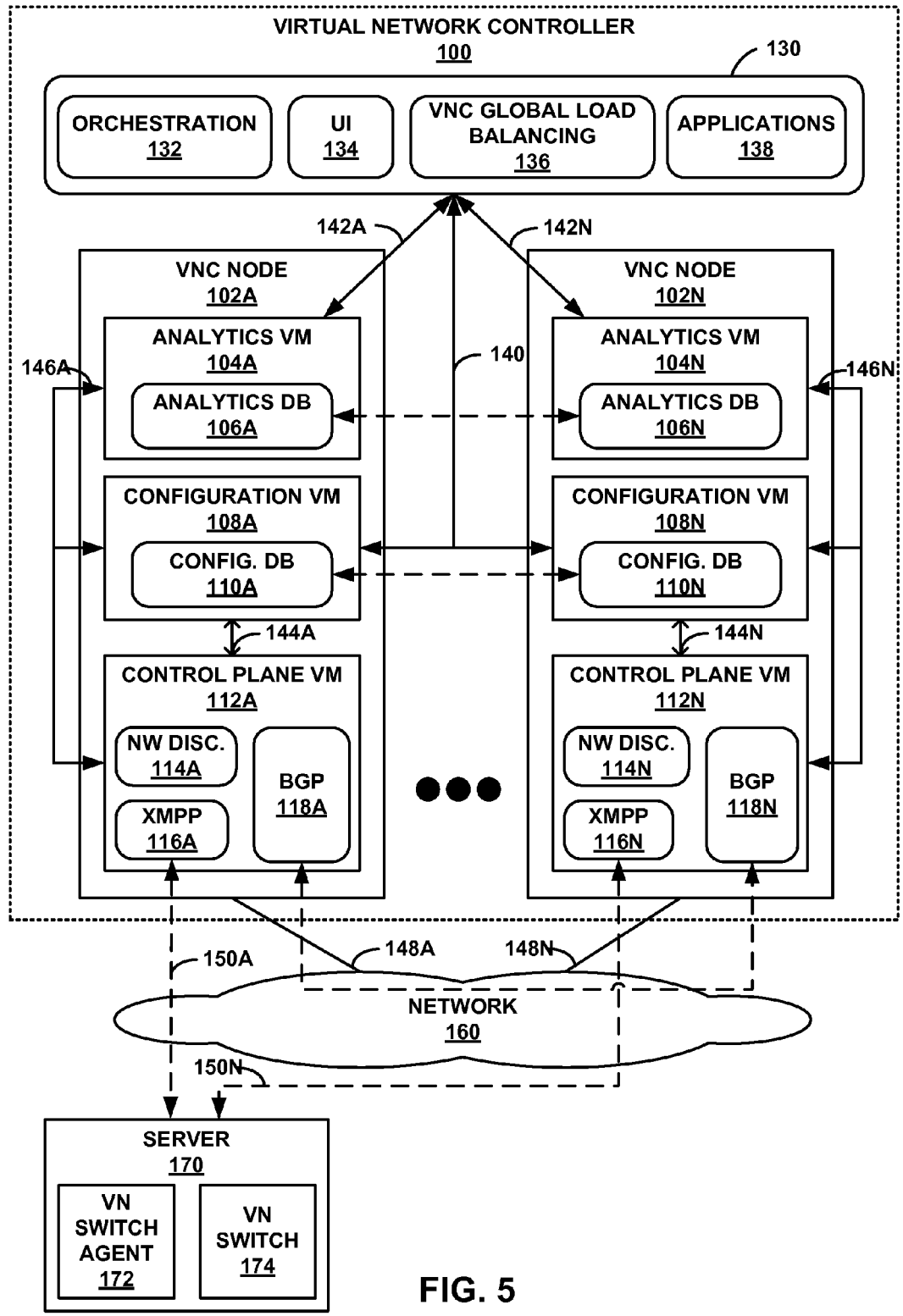
FIG. 5 is a block diagram illustrating an example implementation of a virtual network controller for facilitating operation of one or more virtual networks in accordance with one or more examples of this disclosure

FIG. 5 is a block diagram illustrating an example implementation of a virtual network controller 100 for facilitating operation of one or more virtual networks in accordance with one or more examples of this disclosure. Virtual network controller 100 may, for example, correspond to virtual network controller 22 of data center 10 of FIGS. 1 and 2 or virtual network controller 22 of FIG. 4.

As illustrated in the example of FIG. 5, distributed virtual network controller (VNC) 100 includes one or more virtual network controller ("VNC") nodes 102A-102N (collectively, "VNC nodes 102"). Each of VNC nodes 102 may represent any of VNC nodes 80 of virtual network controller 22 of FIG. 4. VNC nodes 102 that peer with one another according to a peering protocol operating over network 160. Network 160 may represent an example instance of switch fabric 14 and/or IP fabric 20 of FIG. 1. In the illustrated example, VNC nodes 102 peer with one another using a Border Gateway Protocol (BGP) implementation, an example of a peering protocol. VNC nodes 102 provide, to one another using the peering protocol, information related to respective elements of the virtual network managed, at least in part, by the VNC nodes 102. For example, VNC node 102A may manage a first set of one or more servers operating as virtual network switches for the virtual network. VNC node 102A may send information relating to the management or operation of the first set of servers to VNC node 102N by BGP 118A. Other elements managed by VNC nodes 102 may include network controllers and/or appliances, network infrastructure devices (e.g., L2 or L3 switches), communication links, firewalls, and VNC nodes 102, for example. Because VNC nodes 102 have a peer relationship, rather than a master-slave relationship, information may be sufficiently easily shared between the VNC nodes 102. In addition, hardware and/or software of VNC nodes 102 may be sufficiently easily replaced, providing satisfactory resource fungibility.

Each of VNC nodes 102 may include substantially similar components for performing substantially similar functionality, said functionality being described hereinafter primarily with respect to VNC node 102A. VNC node 102A may include an analytics database 106A for storing diagnostic information related to a first set of elements managed by VNC node 102A. VNC node 102A may share at least some diagnostic information related to one or more of the first set of elements managed by VNC node 102A and stored in analytics database 106, as well as to receive at least some diagnostic information related to any of the elements managed by others of VNC nodes 102. Analytics database 106A may represent a distributed hash table (DHT), for instance, or any suitable data structure for storing diagnostic information for network elements in a distributed manner in cooperation with others of VNC nodes 102. Analytics databases 106A-106N (collectively, "analytics databases 106") may represent, at least in part, one of distributed databases 82 of distributed virtual network controller 22 of FIG. 4.

VNC node 102A may include a configuration database 110A for storing configuration information related to a first set of elements managed by VNC node 102A. Control plane components of VNC node 102A may store configuration information to configuration database 110A using interface 144A, which may represent an Interface for Metadata Access Points (IF-MAP) protocol implementation. VNC node 102A may share at least some configuration information related to one or more of the first set of elements managed by VNC node 102A and stored in configuration database 110A, as well as to receive at least some configuration information related to any of the elements managed by others of VNC nodes 102. Configuration database 110A may represent a distributed hash table (DHT), for instance, or any suitable data structure for storing configuration information for network elements in a distributed manner in cooperation with others of VNC nodes 102. Configuration databases 110A-110N (collectively, "configuration databases 110") may represent, at least in part, one of distributed databases 82 of distributed virtual network controller 22 of FIG. 4.

Virtual network controller 100 may perform any one or more of the illustrated virtual network controller operations represented by modules 130, which may include orchestration 132, user interface 134, VNC global load balancing 136, and one or more applications 138. VNC 100 executes orchestration module 132 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 136 executed by VNC 100 supports load balancing of analytics, configuration, communication tasks, e.g., among VNC nodes 102. Applications 138 may represent one or more network applications executed by VNC nodes 102 to, e.g., change topology of physical and/or virtual networks, add services, or affect packet forwarding.

User interface 134 includes an interface usable to an administrator (or software agent) to control the operation of VNC nodes 102. For instance, user interface 134 may include methods by which an administrator may modify, e.g. configuration database 110A of VNC node 102A. Administration of the one or more virtual networks operated by VNC 100 may proceed by uniform user interface 134 that provides a single point of administration, which may reduce an administration cost of the one or more virtual networks.

VNC node 102A may include a control plane virtual machine (VM) 112A that executes control plane protocols to facilitate the distributed VNC techniques described herein. Control plane VM 112A may in some instances represent a native process. In the illustrated example, control VM 112A executes BGP 118A to provide information related to the first set of elements managed by VNC node 102A to, e.g., control plane virtual machine 112N of VNC node 102N. Control plane VM 112A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 112A-112N) may execute different software versions. In one or more aspects, e.g., control plane VM 112A may include a type of software of a particular version, and the control plane VM 112N may include a different version of the same type of software. The peering configuration of the control node devices may enable use of different software versions for the control plane VMs 112A-112N. The execution of multiple control plane VMs by respective VNC nodes 102 may prevent the emergence of a single point of failure.

Control plane VM 112A communicates with virtual network switches, e.g., illustrated VM switch 174 executed by server 140, using a communication protocol operating over network 160. Virtual network switches facilitate overlay networks in the one or more virtual networks. In the illustrated example, control plane VM 112A uses Extensible Messaging and Presence Protocol (XMPP) 116A to communicate with at least virtual network switch 174 by XMPP interface 150A. Virtual network route data, statistics collection, logs, and configuration information may in accordance with XMPP 116A be sent as XML documents for communication between control plane VM 112A and the virtual network switches. Control plane VM 112A may in turn route data to other XMPP servers (such as an analytics collector) or may retrieve configuration information on behalf of one or more virtual network switches. Control plane VM 112A may further execute a communication interface 144A for communicating with configuration virtual machine (VM) 108A associated with configuration database 110A. Communication interface 144A may represent an IF-MAP interface.

VNC node 102A may further include configuration VM 108A to store configuration information for the first set of element to and manage configuration database 110A. Configuration VM 108A, although described as a virtual machine, may in some aspects represent a native process executing on an operating system of VNC node 102A. Configuration VM 108A and control plane VM 112A may communicate using IF-MAP by communication interface 144A and using XMPP by communication interface 146A. In some aspects, configuration VM 108A may include a horizontally scalable multi-tenant IF-MAP server and a distributed hash table (DHT)-based IF-MAP database that represents configuration database 110A. In some aspects, configuration VM 108A may include a configuration translator, which may translate a user friendly higher-level virtual network configuration to a standards based protocol configuration (e.g., a BGP L3VPN configuration), which may be stored using configuration database 110A. Communication interface 140 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 100 may be flexible for new applications 138.

VNC node 102A may further include an analytics virtual machine (VM) 104A to store diagnostic information (and/or visibility information) related to at least the first set of elements managed by VNC node 102A. Control plane VM and analytics VM 104 may communicate using an XMPP implementation by communication interface 146A. Analytics VM 104A, although described as a virtual machine, may in some aspects represent a native process executing on an operating system of VNC node 102A.

Analytics VM 104A may include analytics database 106A, which may represent an instance of a distributed database that stores visibility data for virtual networks, such as one of distributed database 82 of distributed virtual network controller 22 of FIG. 4. Visibility information may describe visibility of both distributed VNC 100 itself and of customer networks. The distributed database may include an XMPP interface on a first side and a REST/JASON/XMPP interface on a second side.

Virtual network switch 174 may implement the layer 3 forwarding and policy enforcement point for one or more end points and/or one or more hosts. The one or more end points or one and/or one or more hosts may be classified into a virtual network due to configuration from control plane VM 112A. Control plane VM 112A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual network switch 174 may be agnostic to actual tunneling encapsulation used. Virtual network switch 174 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 102 may be provided by different suppliers. However, the peering configuration of VNC nodes 102 may enable use of different hardware and/or software provided by different suppliers for implementing the VNC nodes 102 of distributed VNC 100. A system operating according to the techniques described above may provide logical view of network topology to end-host irrespective of physical network topology, access type, and/or location. Distributed VNC 100 provides programmatic ways for network operators and/or applications to change topology, to affect packet forwarding, and/or to add services, as well as horizontal scaling of network services, e.g. firewall, without changing the end-host view of the network.

In accordance with the techniques of this disclosure, virtual network controller 100 may be configured to aggregate data for a set of two or more related processes, to form aggregated data for the set of two or more related processes. In particular, virtual network controller 100 may determine the set of two or more related processes executed by respective devices in a virtual network of network 160, and receive data for the set of two or more related processes. In general, the set of processes may correspond to a common "tier," e.g., a common network plane, and each of the processes in a particular set may be substantially similar. By executing substantially similar processes on different devices, network 160 may provide high availability and reduce risk of failure.

More particularly, in accordance with the techniques of this disclosure, computing devices of network 160, and processes executed by the computing devices, may be divided into various tiers. Within each tier there may be a set of related (e.g., substantially similar) processes. Furthermore, virtual network controller 100 may define User-Visible Entities (UVEs) for the various tiers. The UVEs may define various data for monitoring processes of the various tiers. For example, the UVEs may define attributes of processes to retrieve. Virtual network controller 100 may receive data output during execution of the processes, and in accordance with the UVEs, extract values for the attributes defined by the UVEs. Virtual network controller 100 may further aggregate this data. For example, the UVE may define a manner in which to aggregate certain types of data, corresponding to the attributes, such as addition, union over sets, concatenation, list generation, or the like.

Virtual network controller 100 may then generate one or more reports that are indicative of a tier and aggregated values for one or more attributes corresponding to the tier, as defined by a corresponding UVE. This aggregation can be performed transparently to the devices executing the processes. That is, the devices executing the processes need not take any part in the aggregation. An administrator may use the generated report to diagnose various aspects of the virtual network of network 160. For example, the report may include data indicative of one or more of a quantitative failure, a fault parameter, a memory failure, a telecommunications failure, a processor failure, a packet resend, and/or a dropped communication session. The administrator may determine, using the report, whether any or all of these conditions apply and act accordingly, e.g., by reprogramming a device of network 160, replacing a device of network 160, adding, replacing, or removing links between devices, adding or upgrading software for one or more devices of network 160, or the like, based on the contents of the report.

In some examples, virtual network controller 100 includes an analytics layer, that is, an intermediate layer that acts on generic rules. The UVEs may define rules in accordance with the analytics layer. Thus, virtual network controller 100 may operate substantially automatically, that is, without user interference, to perform the techniques of this disclosure. The analytics tier may use definitions of the UVEs to extract information from communications output by the devices executing the corresponding processes and aggregate values for certain attributes, as defined by the UVEs, of the communications.

In this manner, virtual network controller 100 represents an example of a controller device configured to determine, for a virtual network, a set of two or more related processes executed by respective devices in the virtual network, receive data for the set of two or more related processes, and aggregate the data for the set of two or more related processes to form aggregated data for the set of two or more related processes.

Figure 6:
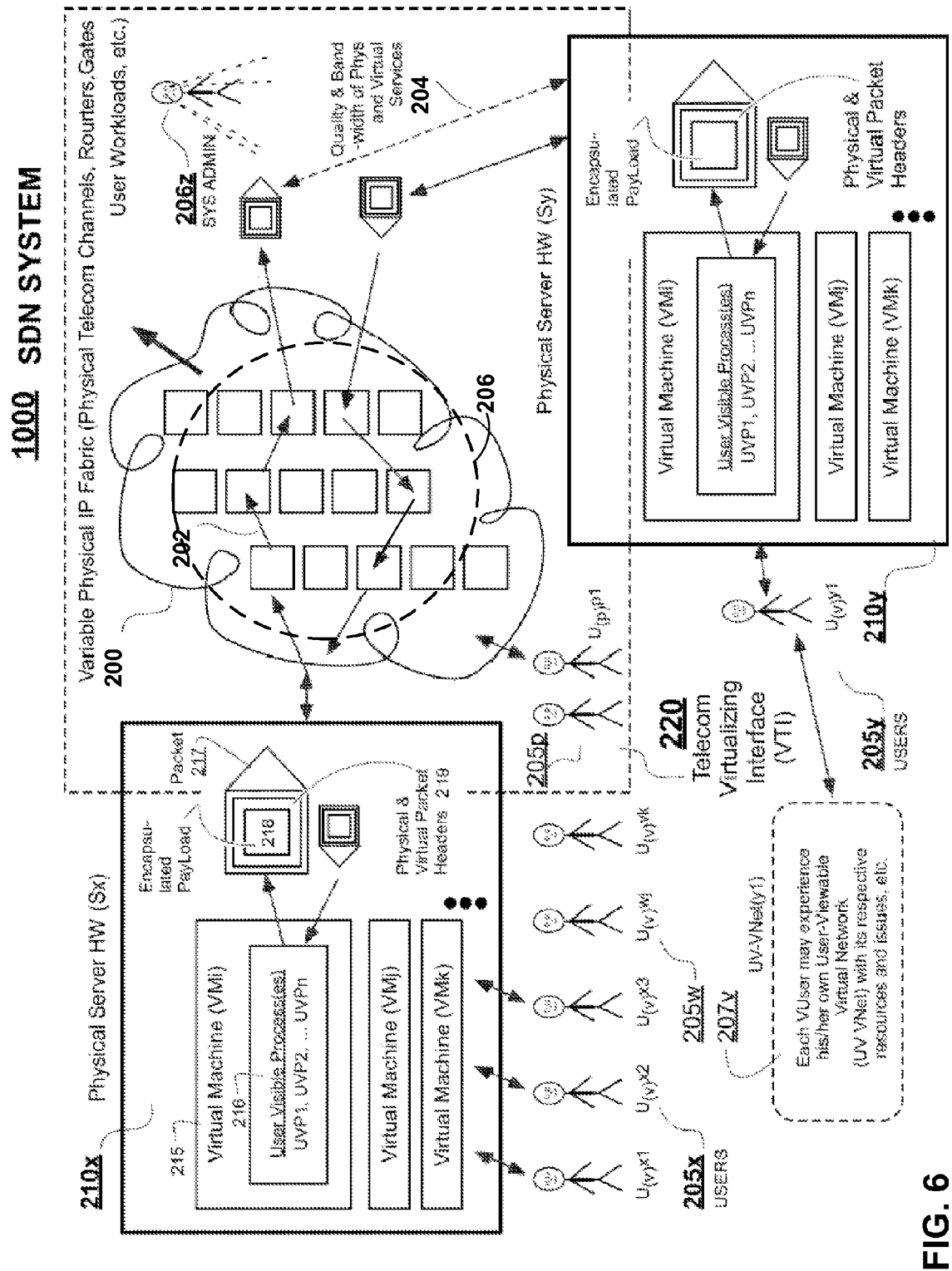
FIG. 6 is a block diagram of a massively distributed complex system, and more specifically, of an SDN system in which a method of tagging traces for later identifying likely faulty processes may be carried out.

FIG. 6 is a block diagram of a massively distributed complex system 1000, and more specifically, of a software defined networking (SDN) system to which the disclosed concepts may be applied. As an example, FIG. 6 may represent a cloud-implementing data center environment in which there is provided a large collection of network-interconnected servers (e.g., servers 210x, 210y, which may correspond to respective servers 12 of FIG. 1) that provide computer and/or storage capacity to run many different users and/or other kinds of application programs (e.g., programs 216, where these programs can include interactive video gaming support processes and/or simple text processing support processes).

Such an environment tends to be very dynamic from an applications point of view. It may be desirable to have a level of automation that insulates users from the infrastructure details and that can avoid the need for manual intervention to interconnect the physical servers to provide the computation, storage, and/or telecommunications capacities required to enable the various applications to execute to one level of sufficiency or another.

In order to enable automation and agility of the infrastructure (e.g., a physical interconnect fabric 200 as well as a scalable processes of physical and/or virtual machines), there is a growing trend to deploy either an overlay networking solution or a virtualized networking system on top of physical computer clusters, where the overlay and/or virtualizing subsystem encapsulates and automatically manages the details of keeping the many physical data processing resources (e.g., resources of servers 210x, 210y), the many physical network switches and routers (e.g., switches 206, which may correspond to devices of IP fabric 20 in FIG. 1, such as chassis switches 18 and/or TOR switches 16 of FIG. 1) and channels (e.g., channel 202) up and running at desired bandwidths (BW) and desired qualities of service (QOS), represented in FIG. 6 by element 204.

Figure 7:
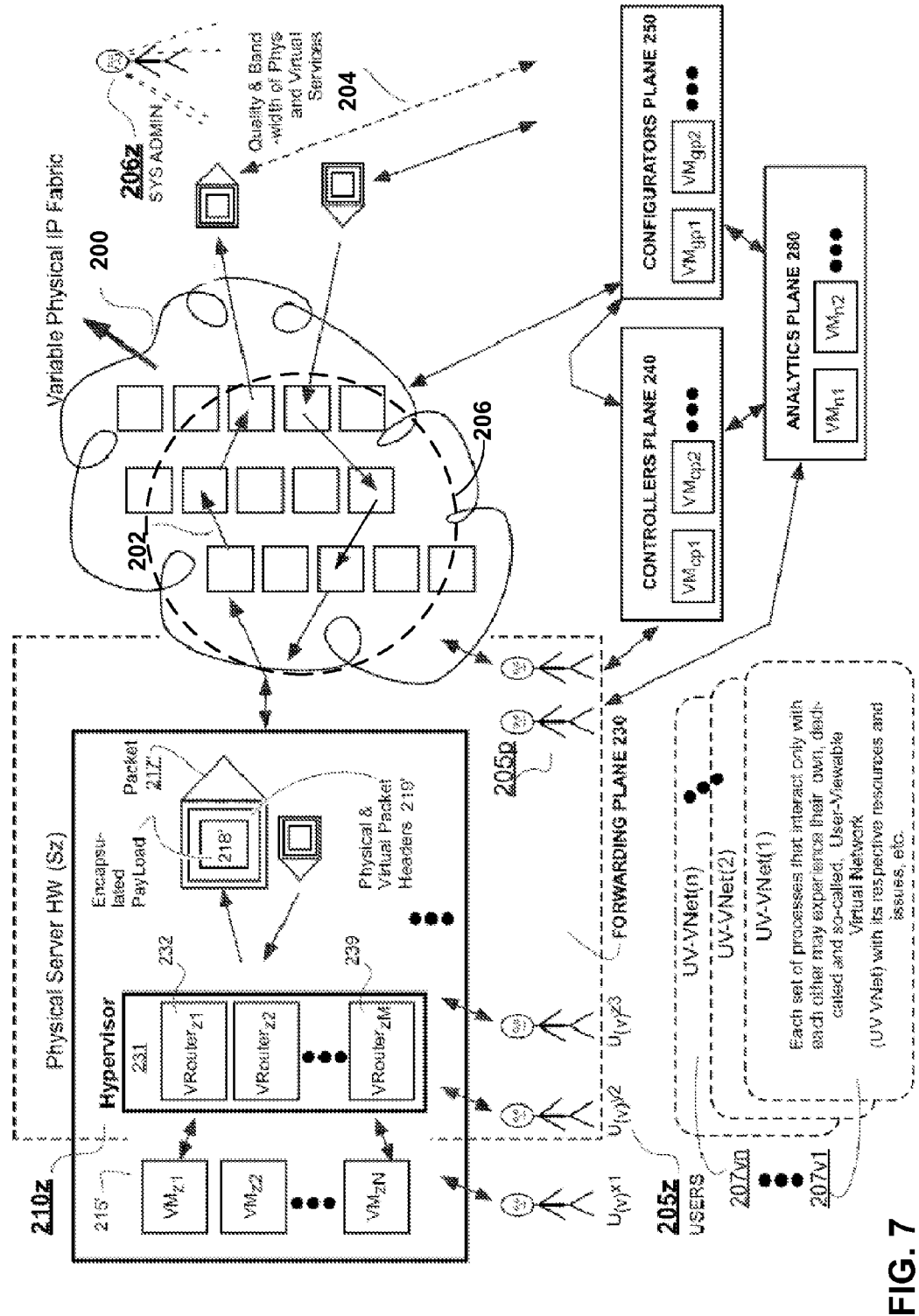
FIG. 7 is a block diagram showing further details (e.g., tiers) of a telecom virtualizing subsystem in which the method of identifying likely faulty components may be carried out.

In such an environment, each of many servers (e.g., servers 210x, 210y) may be running one or more application processes (e.g., process 216) and/or guest operating systems (internals of which are not explicitly shown). In order to enable many guest operating systems (also called virtual machines (VMs) 215) on a single server, the system may utilize a virtual machines monitoring system, commonly known as hypervisor (such as ESX, Hyper-V, KVM, Xen, etc.). Hypervisor 231 of FIG. 7 represents an example of such a hypervisor. A single application (e.g., which includes a process or thread UVP1 executing inside a processes support means 216) may require many instances of computer and storage resources that may be provided by the infrastructure as multiple individual servers and/or multiple virtual machines running on one or more servers. In order for the application to share information amongst its distributed computer and storage instances, and with the outside world, a telecommunications network 200 is generally used to enable movement of this information as, for example, packet conveyed data signals (217). Every time a new application is instantiated and/or changed on the infrastructure, a respective virtual network (e.g., VNet 207v) may be created and/or changed to support the new/changed application and to allow all its computer and storage instances to share information with one another and/or the outside world.

The term "user-viewable" as used herein is to be understood as referring to a user defined partitioning of at least an inter-processes communications layer of a system into mutually exclusive sectors where all the inter-processes communications of a set of processes under investigation by the user are presumed by the user to be limited to taking place through one of the partition sectors but not any of the others and thus investigation of process interactions (e.g., for purpose of debugging a problem of such interactions) can be limited to investigating inter-process communications only occurring within the associated one of the plural sectors. The term "user-viewable" as used herein may be understood more broadly as referring not only to the one inter-processes communications sector, but also to the processes themselves and to the other system resources (in addition to the associated and dedicated sector of the communications layer) that the processes under investigation are presumed to use on an exclusive basis (e.g., dedicated virtual machines that support the processes under investigation). Thus, all the inter-process activities of the set of processes under investigation by the user can be presumed by the user to be limited to taking place only inside the user defined User-Visible Entity (UVE) and thus investigation of process actions and interactions (e.g., for purpose of debugging a problem of such interactions) can be limited to investigating operations taking place only inside the associated UVE.

An example of what could be deemed to be a UVE is all the processes of an identified user application program including inter-processes communications resources dedicated to that application program and including computer and storage resources dedicated to that application program. However, the definition is not limited to a single user and/or a single application program. A single UVE can encompass resources dedicated to multiple unrelated applications of one or more identified users, subject to appropriate authentication that the resources (e.g., a partitioned part of the system communications layer) are indeed dedicated to the identified multiple applications. In other words, more generally, a UVE may be thought of as representing some dedicated (partitioned-for-investigation) aspects of operational states of a system or of its resources where investigation can then be limited to the dedicated aspects for purpose of trying to operate, provision, troubleshoot or analyze a corresponding part of the system in some manner. The UVE, in many instances, may exclude those lower level aspects of system states and system resources that are for internal system use only, are hidden (encapsulated away) from the user processes that are under investigation and are thus not intended to represent part of the system application interface to an outside world of user applications. Making all system state and resources (including lower level ones) visible to external applications may be confusing and overwhelming to investigatory applications rather than helpful. The dedicated subset of system states and resources that are deemed to be "User Visible" may be re-evaluated from time to time and changed as respective users see fit.

Each UVE may be associated with a definition file. The definition file may specify a type of aggregation for each attribute associated with the UVE (e.g., summation, concatenation, list formation, union over sets, or the like). An aggregator may use the aggregation information of the definition file. That is, processes corresponding to the UVE need not use the aggregation information. Each of the UVEs may be specified in an interface definition language file. An analytics tier may use extra attributes defined in the interface definition language file to perform aggregation. When UVEs are sent to the analytics tier, messages may mark attributes of the UVEs with aggregation tier. Thus, devices or processes executing at the analytics tier may receive both values for attributes associated with a UVE, as well as aggregation information associated with the UVE. In this manner, these devices or processes at the analytics tier may use the aggregation information to determine how to aggregate values for the attributes. In this manner, the aggregation of information can be performed without the processes that generate the information actively participating in the aggregation. That is, an aggregator may receive individual streams of information from the various processes and aggregate the information, without requiring a change on the part of the processes that generate the information to be aggregated.

Additionally, the system states and resources that are deemed to be part of a specific UVE do not each have to be directly visible to a corresponding one or more non-administrative users of the application(s) which fit inside the specific UVE. Rather the corresponding compute, storage and telecommunication resources need only be visible to each other for allowing corresponding user processes to interact with one another as required by the corresponding application and/or set of applications that are under investigation. At the same time, the corresponding compute, storage and telecommunication resources should not be visible to; and capable of being interfered by, resources of external other user applications that are not under investigation. If something goes wrong (e.g., a failure) within a given application (or set of applications), it is expected that only the "visible" compute, storage and telecommunication resources that are dedicated to that given application will be involved and thus those are the ones that should be under investigation. (Stated otherwise and referring briefly to FIG. 8, a specific User-Visible Entity (e.g., UVE(2)) may be conceptualized as a dedicated partition that cuts orthogonally across a plurality of system planes (strata), including one or more system telecommunication planes (e.g., a virtual forwarding plane).

In a virtualized or overlay network environment, the edge of the network is extended from the physical network elements (e.g., switches 206 or the like (such as routers)) to software switches (e.g., a VRouter like 232 of FIG. 7) running inside the corresponding hypervisor (231, also in FIG. 7) or inside the host operating system on the physical server (e.g., 210z). The so-virtualized and/or overlayed network that is used by the interacting applications to communicate with their respective process instances is created dynamically and managed by software switch controlling means (e.g., 240) having its own addressing and security scheme where the latter is orthogonal from the physical network (200) and its addressing scheme. There are many different methods that can be employed to transport packets (e.g., 217) within and across the virtual network(s) and over the physical network.

Network IP (and/or Ethernet) packets (e.g., 217) generated or consumed by the instances of each isolated application in the virtual networking domain are encapsulated in further IP (and/or Ethernet) packets that are transported by the physical network. Herein, the virtual network packet will be referred to as inner packet and the physical network packet will be referred to as outer packet. The function of encapsulation and/or de-capsulation of the virtual network packet within physical network packet is done in the hypervisor (231) or the host O/S (not shown) running on the server 210. In addition, the encapsulation and de-capsulation function can also be performed at the edge of the network in a first-hop physical network switch (e.g., one of switches 206), a network router, or the like. This functionality is commonly called tunneling and is actively used in networking to create overlay networks. There are many different tunneling protocols used in the industry wherein different protocols are carried within another protocol, for example, IP over GRE, VxLAN, MPLS over GRE, etc.

Cloud data-center networks can constitute an example of a massively distributed complex system because the number of interconnected servers can be very large with each server presenting one or more links, each having a respective 1 Gbps or 10 Gbps or greater bandwidth link. In order to construct a network that can interconnect all such links, operators generally use a number of switches (or routers) each with N input (ingress) links×M output (egress) links. Each of these individual switches can act as an IP router with its own IP address(es). Plural routers may be operatively cross coupled to define CLOS networks of routers or similar multi-stage routing arrangements.

Referring to some of the specifics shown in FIGS. 6-7, there can be a plurality of different kinds of components in respective "tiers" or service planes of a virtualized overlay system.

One of these planes is the virtual-to-physical forwarding plane 230 (shown in FIG. 7). It includes the so-called, virtual network routers (VNRouters, or more simply VRouters 232-239). These components can reside in the respective hypervisors (231) of the respective physical servers (e.g., 210) or they can reside on a so-called, Top of Rack switch (not shown) which is typically included in the virtual-to-physical forwarding plane 230. When the VRouter is disposed in the hypervisor, it acts as a software switch having both respective virtual ports connected to the virtual machines (VMs) and physical ports corresponding to the physical I/O ports of the respective server 210. Each VNRouter selectively routes/switches packets between its virtual ports and the physical ports and/or between its virtual ports. The VNRouters may be considered as Data/Forwarding Plane components of the Virtual Network System. In order to support scalable flexibility, some of the VRouters (e.g., 232-235) in a given hypervisor may be dedicated to servicing a first virtual network (UV-Vnet(1)), another subset of the VRouters (e.g., 236-237) may be dedicated to servicing a second virtual network (UV-Vnet(2)) and yet another subset of the VRouters (e.g., 238-239) may be held in reserve for dynamic assignment to one of the first and second user-viewable networks (e.g., UV-Vnet(1), UV-Vnet(2)) or to a dynamically instantiated other virtual network (Vnet).

Another of the plural tiers or planes within the SDN system 1000 is referred to as the Control Plane 240 and it may contain a plurality of virtual machines ($VM_{cp-i}$) implementing respective Controllers or Controller Processes. These are typically configured as horizontally scalable components (just as the VRouters are typically configured as horizontally scalable components) that provide dynamically scalable control functions within the Virtual Network System. The Controllers each operatively couples to a respective set of VNRouters and each distributes respective routing information signals to its dynamically scalable set of VNRouters. In one example, the relative scale of the Virtual Network System is on the order of 100 s of 1000 s of VNRouters (e.g., 232) and 100 s of corresponding Controllers (e.g., VNcp1).

Another of the plural tiers or planes within the SDN system 1000 is referred to as the Configurations Plane 250 and it may contain a plurality of virtual machines ($VM_{gp-k}$) implementing respective Configuration Processes. These are typically configured as horizontally scalable components (just as the VRouters and the Controllers are typically configured as horizontally scalable components) that provide control functions with respect to interconnect and/or other configurations within the Virtual Network System. The Configuration controllers each operatively couples to a respective parts of the physical network (200) and/or to respective parts of the Control Plane 240 and each distributes respective configuration information signals to its controlled counterparts.

Yet another of the plural tiers or planes within the SDN system 1000 is referred to as the Analytics plane 280. Components (e.g., VMn1) within the Analytics plane 280 are typically charged with automatically monitoring and/or automatically collecting reported states of other parts of the Virtual Network System. In other words, the Analytics component are typically tasked with gathering information from all other components in the system so as to develop a bird's eye or big picture view of what is occurring in the system as a whole. This Big Data information is generally stored in a persistent database. This information can then be used to show the current state of the system, to help debug problems, to do historical or real-time analysis of the system and so on.

Because of the highly scalable and variable nature of the SDN System 1000, it is prone to many fault and failure modes. In other words, because of the scale and numbers of components involved, it is likely that one or more are in failure mode. On the other hand, it is desired that the SDN System 1000 provide its users (e.g., 205x, 205y, 205w, 205z) with continuously robust, reliable, wide bandwidth and high quality services. So the in-failure mode components need to be worked around, for example by drawing on the spare components that are typically held in reserve in each horizontally scalable tier. In other words, the SDN System 1000 may be resilient and continue to operate at near peak capability despite isolated failures in various ones of its components. The various components that desirably avoid failures and/or are configured to work around known or expected failure modes include the different kinds of components in the respective and different tiers or planes, including the forwarding plane 230, the control plane 240, the configuration plane 250 and even the global analytics plane 280.

Sometimes, a complex and hard-to-trace-and-debug failure mode develops in such a complex and massively distributed system. Sometimes, it is necessary for system administrators (e.g., 206z) to trace back to individual processes (e.g., UVP1, UVP2, . . . UVPn) within individual user-viewable domains (e.g., user-viewable virtual networks (Vnet's), or more generally UVE's) in order to determine what went wrong.

However, a commonly shared search key that ties together the individual and local trace logs of respective processes in respective virtual and/or physical machines, a commonly shared search key that ties together the processes of specific component tiers, and a commonly shared search key that ties together the processes of specific process instances, may not be available.

In accordance with one aspect of the present disclosure, at the time of trace log generation, each such trace log or other report is automatically tagged with at least one of: (a) a unique User-Viewable Entity (UVE) identifying key (UVEKey) that identifies the corresponding dedicated virtual network (Vnet) and/or other UVE to which the process of the respective report (e.g., trace log) belongs; (b) a respective system tier identifying key (TRxKey) that identifies the corresponding system tier (TRx, e.g., Virtual-to-physical Forwarding Plane) to which the process of the respective report belongs; (c) a respective virtual and/or physical execution machine identifying key (VMKey, PMKey) that identifies the corresponding virtual machine (VM) and/or physical machine (PM) to which the process of the respective report belongs; (d) a respective process instance identifying key (PINKey) that identifies the corresponding instance PIN of a plurally-instantiated and also identified process to which the respective report belongs; and (e) a respective current operational state indication (Op-State) that indicates a current operational state of a respective UVE, Tier, VM, PM or other such stratifying attribute with which the respective report is associated.

The so-tagged process reports (e.g., trace logs, exception reports, etc.) are then automatically relayed at or soon after the time of generation to a centralized database (e.g., in a Global Analytics Plane) so that they will not be lost due to local memory failures or faults and so that they can then be centrally queried by a system administrator (e.g., 206z) who uses one or more of the added-on tags (e.g., UVEKey, TRxKey, VMKey, PMKey, PINKey, Tier-Op-State, other strata Op-State, etc.) as part of structured queries into the centralized database (e.g., maintained in a Global Analytics Plane of the massively distributed system) for determining the more likely causes of later in time failures. The queryable database may also be used even before a failure occurs to identify likely fault conditions that may lead to a failure, where the likely fault conditions are determined based on past historical records in the database that indicate which of various strata Op-States in combination with which of various exception reports are likely to lead to process failures.

More specifically, the here disclosed teachings may be applied to a Distributed System (e.g., a software defined network (SDN) system) made up of multiple tiers, each having a respective different functionality. Each tier is meant to be independently horizontally scalable, consisting of multiple processes running on different machines, with each process carrying out the same basic operations but on different instance of respective data. No one process within a tier may manage the entire tier. In other words, the processes are peers, and the tier is designed not to have a single point of failure that brings down the whole tier.

For sake of operations reliability and system maintenance, the System Administrator ("Admin") is empowered by the present disclosure to see the system as a collection of unique User-Visible Entities (UVEs). Each UVE has per-tier attributes, which help the Admin to confirm that the tiers are working correctly together or not. But the UVE alone does not have any per-process representations. When normal operations are taking place, the Admin does not need to be aware how many processes exist in a given tier or what their individual statuses are.

However, the actual operations of the system are happening on a per-tier, per-instance basis. Investigation of some types of complex problems may need examination of execution traces from the individual processes. The present disclosure empowers the Admin to efficiently query process execution traces by use of various UVE, tier and/or other tagging data contained in the traces. The present disclosure empowers the Admin to easily correlate process execution traces to respective UVEs. The present disclosure empowers the Admin to programmatically access UVE state changes and process execution traces and run analysis algorithms that will allow the Admin to catch and/or predict problems automatically, and/or trigger the collection of more information.

In accordance with one aspect of the present disclosure, a special "Analytics Tier" is provided, which the user can connect to for looking at the dedicated UVEs and the massively distributed processes that belong to the respective UVE's. More specifically, the following Data Structure and method may be used:

In the special Analytics Tier, there is automatically defined one Op-State object per UVE that represents the aggregated operational state of the object, and which contains the following:
  key (A Unique Key)
  list of Tier-Op-State (the Op state of this UVE may be provided in that Tier)

Individual Processes in various tiers are not allowed to generate free-form text messages for their process execution trace, in some examples. Instead, in such examples, they are forced to automatically generate objects containing the following information, and send them up to the Analytics Tier:
  key: (Key of the UVE which this execution trace message refers to)
  Tier-Op-State: (Tier-Op-State for this UVE, as seen on this process of the tier)

The Tier-Op-State can be considered to be list of attributes. The value of an attribute can be:
  A basic data type
  A structure (consisting of a list of sub-attributes and/or other sub-structures and sub-containers)
  A container holding multiple items of basic data types, sub-structures or sub-containers.

The schema of "Tier-Op-State" can be different on a per-UVE-per-Tier basis. When a respective process sends its process execution trace, it may choose to fill in only a subset of the attributes rather than all. The reason is that place in the code where the process execution trace is being generated from may not have easy access to all attributes.

Once the respective processes reports are relayed to the centralized Analytics Tier, Analytics Processing may proceed as follows. Different processes in the Analytics Tier may be made responsible for tracking the Operational States of different UVEs, so that the Analytics layer is horizontally scalable. When an analytics process receives a process execution trace object, it updates its view of the aggregated state of the given UVE. This process execution trace object can arrive as an event, or batches of trace objects can be periodically read from a log.

In one example, a Virtual Network System (1000) has at least 3 tiers (in addition to the Analytics Tier). Tier 1 is the Config-Tier (configurators plane 250 in FIG. 7) with a respective one or more virtual machines therein and for sake of this example, 3 processes (A1, A2 and A3) executing in that tier. Tier 2 is ControlPlane-Tier (240) with a corresponding 5 processes (B1-B5) executing in that tier for the sake of this example. Tier 3 is the SDN Forwarding-Tier (230) with 20 processes (C1-C20) executing in that tier for the sake of this example.

Consider now a specific UVE, say one representing a Virtual-Network having the identification of being UV-VNet (1) among a plurality of otherwise identified UVE's (see 207v1-207vn of FIG. 7).

The Tier 3 representation of this exemplary UVE (UV-VNet(1)) may have the following attributes:
  int bytes_received;
  list<string> virtual_machine_names;

The corresponding Virtual-Network exists on processes C1, C4, C10 and C15 (of the SDN Forwarding-Tier 230); and each sends their versions of these attributes as part of their respective execution traces. For example, some traces report a change in "bytes_received". Other traces report that an element has been added to or deleted from "virtual_machine_names". In response, the analytics process responsible for the identified Virtual-Network (e.g., 207v1) gets these traces. It maintains and updates 4 different Tier-3 snapshots of the respective Virtual-Network (e.g., 207v1). Then, when the analytics process gets a "bytes_received" trace for process C4, it just needs to replace the "bytes_received" attribute for corresponding snapshot C4. But when it gets a "virtual_machine_names" item addition or deletion for process C4, it needs to add or delete from its "virtual_machine_names" attribute for snapshot C4. Thus workload on the Analytics Tier may be minimized for normal process operations.

During process failures or error conditions, it is possible that some process execution traces are "lost". To mitigate this, the method uses sequence numbers on a per-UVE basis for traces sent from a process up to the Analytics layer. If there is a gap in sequence numbers, the analytics layer can ask the process to replay the entire current state of that UVE on that process. Also, in one example, processes explicitly send a trace when a UVE disappears from the process.

Interactions between Admins and/or other users and the Analytics layer (280) may include the following: When the system user asks for the Tier-3 state of this UVE, the request is forwarded to the analytics process responsible for the respective Virtual-Network (e.g., 207v1). This analytics process may present the users with one single view by aggregating the 4 pieces of Op-State snapshots of process C1, C4, C10 and C15 for example. This aggregation method may involve simple addition across these process views (e.g. for "bytes_received"), or a union of sets (e.g. for "virtual_machine_names"), or other operations as well. The Analytics tier can do this on demand (when a user or another program asks for this UVE), or it can do this proactively and periodically.

In view of the above it is seen that a method is provided for realizing the goal of tying together with one or more commonly shared search keys such as a UVEKey, a TRxKey, a PINKey, a VMKey, a PMKey and/or a strata Op-State indicator individual trace logs and/or other automatically generated reports of processes spread across a massively distributed system (e.g., a software defined network (SDN) system 1000) so that those of the reports that are associated with one another by virtue of commonality to a specific UVE and/or Tier and/or virtual machine and/or strata Op-State, etc., may be logically linked together for analysis purposes. The centralized and cross-correlated reports that are automatically created by this method may be used to analyze complex failure modes and even to predict likely failures of particular components before the failures actually happen and to then responsively replace and/or restart the likely-to-fail components and/or to reconfigure resource capacities (e.g., number of VM's, number of PM's, amount of physical memory etc.), to reconfigure interconnects for getting around the likely-to-fail components before the latter actually fail. For instance, this prediction ability may allow system operators to systematically bring down corresponding parts of the system during off-peak hours and to replace and/or fix the likely-to-fail components before actual failure thus minimizing the impact of likely failures on the overall system.

In accordance with the present disclosure, a method is provided for globally analyzing down to the processes level, the components of a massively distributed system and identifying likely at-fault components in such a massively distributed complex system. The method includes one or more of the following steps:

(a) subdividing the system into a plurality of tiers (e.g., 230, 240, 250, 250, 280) each characterized by having alike components (e.g., VRouters) within that tier;

(b) subdividing system operations into a plurality of User-Visible Entities (UVE's; e.g., virtual networks or Vnets 207) each characterized by having respective processes and other resources dedicated to serving needs of the respective UVE's;

(c) for each respective UVE and tier, identifying respective process reports that cross correlate with a corresponding UVE Key and a corresponding Tier key where the reports may include quantitative failure or fault parameters such as memory failures, telecommunications failures, processor failures, packet resends and/or drops, etc.) and relaying the UVE and Tier tagged reports to a centralized and query-able database;

(d) for each respective process report that is locally generated, automatically tagging the report with one or more linking keys including a UVEKey;

(e) for each respective tier, automatically determining what part of its resources are used by each of respective UVE's and automatically determining if the allocated resources of any UVE are insufficient due to repeated component failures (e.g., lost packets);

(f) for each respective UVE and its detected component failures, logically associating the detected component failures with one or more of the respective captured parameter snapshots that immediately preceded the respective component failures for that UVE;

(g) investigating those of the UVE associated reports that were correlated to failure as being likely to point to the at-fault components and/or tiers of that UVE; and (h) taking preemptive corrective and/or work-around measures for those of the respective tier components and UVEs that were determined to be more highly likely to enter a failure mode based on the investigation.

Figure 8:
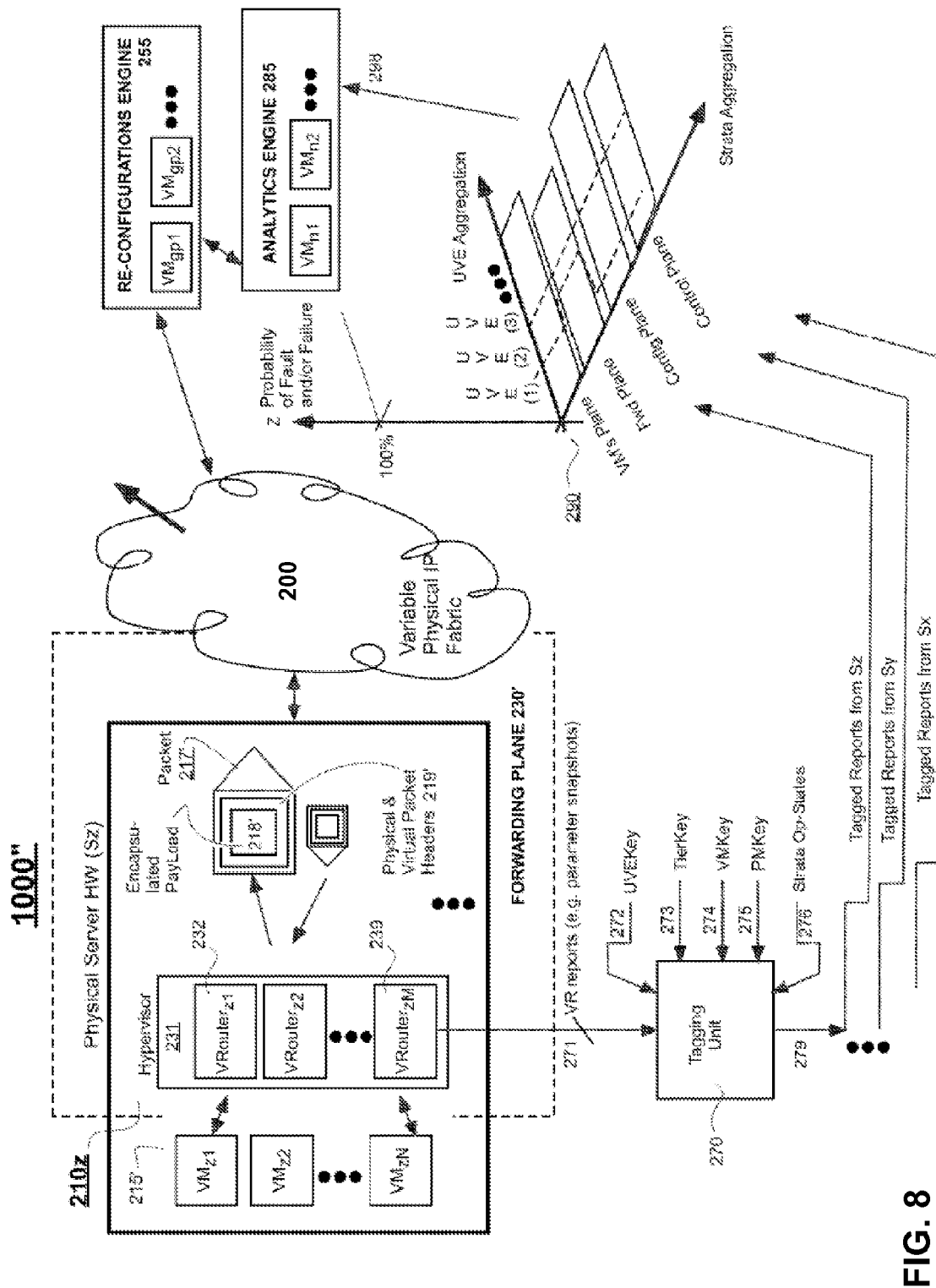
FIG. 8 is a schematic and signal flow diagram illustrating how reports are tagged and aggregated.

Referring to FIG. 8, shown here is a block diagram of an SDN system 1000" that includes, for a respective one of its tiers (e.g., the VRouters tier), a corresponding reports classifier 270 that is coupled to automatically repeatedly (e.g., periodically) receive parameter snapshots 271 indicative of corresponding operating modes of the components (e.g., virtual processes (not shown) in respective ones of the VRouters 232-239) and to automatically tag them. More specifically, during tagging mode each of the parameters snapshots 271 is accompanied has added to it one or more of a respective UVE Key 272, Tier Key 273, VM Key 274, PM key 275 and/or one or more Strata Op-State indicators (e.g., Tier Op State) indicating whether the sample belongs to a failure Op State or a non-failure Op State for example. The tagged reports 279 from the various resources (e.g., servers) of the massively distributed system are then transmitted to a more centralized Analytics engine 285 for structured aggregation (290) according to respective UVE identifications and strata identifications. The aggregated reports may include data that classifies them as belonging to either a normal operations (good) class or as a distressed of failed (bad, e.g., as measured up from a 0% likely to be bad plane to a 100% likely to be bad plane along the Z axis). These aggregated outputs 298 are stored in and used by the corresponding analytics engine 285 to determine what is happening for each UVE and/or tier on a big picture basis. In one example, the corresponding analytics engine 285 is coupled to a re-configuration engine 255 that, in the case where a subsequently received and analyzed parameter snapshots 279 indicate likelihood of failure, re-configures the system so as to preemptively try to avoid failure.

In one example, the Analytics plane collects respective snapshot data relevant to likelihood of failure from various components within the respective UVE's, tiers, planes, physical resources of the system. Respective snapshot data may include for example, parameters like CPU utilization levels, memory utilization levels, alarm levels in the various system parts and so on. These collected respective and likely to be relevant snapshots (279) could be early indicators of growing faults and/or upcoming failures in respective tiers and/or for respective UVE's (e.g., ones that have greater demand for system bandwidths).

While FIG. 8 shows by way of example, the collecting of snapshots from the VRouters tier 232-239 of a respective one server 210z, it is understood that similar collections of respectively relevant and tagged parameter snapshots may be taking place for other tiers and/or system planes and/or servers across the massively distributed system and aggregated into the Analytics engine 285. The XYZ frame work 290 shown in FIG. 8 is for sake of simple illustration of aggregated and classified parameters and it is within the contemplation of the disclosure to have N-dimensional mappings with each axis (e.g., U, V, X, Y, etc.) representing a respective one of the monitored parameters as distributed relative to UVE, relative to tier, relative to physical machine (PM) and so on. Part of the analytic investigation may include that of determining for each tier and UVE what parameters are best indicators of growing faults and/or predictable failures. Trained classification algorithms may afterwards be used to predict the likelihood of failure of the respective components on a continuous basis as the data is being collected by the Analytics for newly instantiated UVE's and virtual processes.

Figure 9:
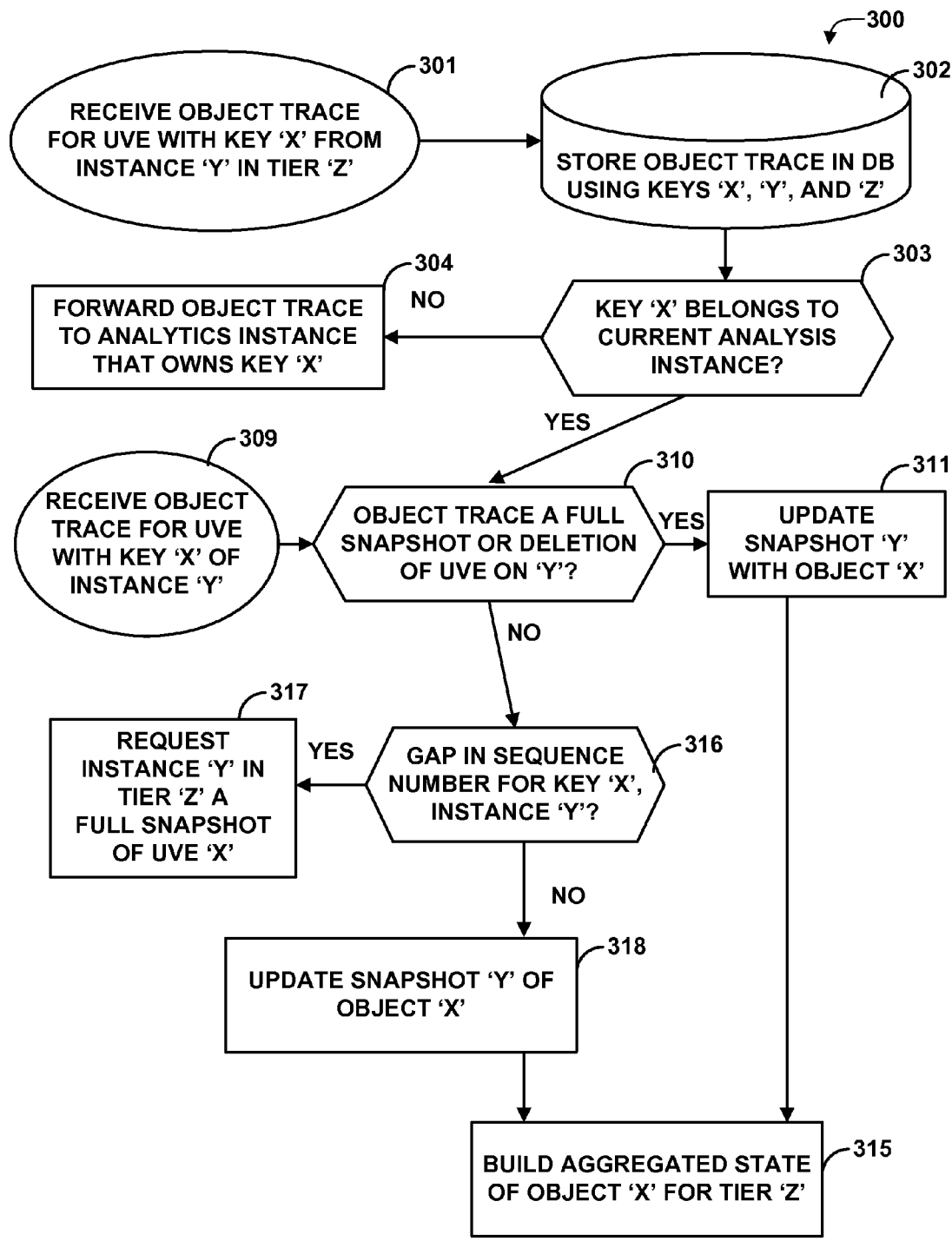
FIG. 9 is a flowchart illustrating a process usable in the system of FIG. 8.

FIG. 9 is a flowchart illustrating an example method 300 that may be carried out, e.g., in the system of FIG. 8. Although generally described with respect to the example of FIG. 8, it should be understood that other devices may be configured to perform any or all of the steps in the method of FIG. 9. For example, virtual network controller 22 may be configured to perform any or all of the steps of the method of FIG. 9. For purposes of explanation, analytics engine 285 of FIG. 8 is explained as performing the steps of FIG. 9.

Initially, analytics engine 285 may receive object trace data for a User-Visible Entity (UVE) with, e.g., key 'X' from instance 'Y' in tier 'Z' (301). That is, the UVE may specify an identifier of 'X' for a key, an identifier of 'Y' for an instance, and an identifier of 'Z' for a tier, where the identifiers X, Y, and Z may comprise respective numeric values (e.g., integer values. Thus, there may be a plurality of tiers, and Z represents the $Z^{th}$ tier, Y represents a $Y^{th}$ instance within tier Z, and X represents a key in the $Y^{th}$ instance of tier Z, for a particular trace. Analytics engine 285 may then store an object trace in a database using keys X, Y, and Z (302). In this manner, keys X, Y, and Z can act as index values for uniquely identifying data for the trace in the database, e.g., for updating, querying, retrieving, or otherwise accessing data for the trace.

Analytics engine 285 may then determine whether key 'X' belongs to a current analysis instance (303). When analytics engine 285 determines that key 'X' for the trace does not belong to the current analysis instance ("NO" branch of 303), analytics engine 285 may forward the created object trace to an analytics instance that owns key 'X' (304). On the other hand, assuming that the current analysis instance owns key 'X,' ("YES" branch of 303), analytics engine 285 may determine whether the object trace is a full snapshot or deletion of a UVE on 'Y' (310), after receiving an object trace for UVE with key 'X' of instance 'Y' (309).

When the object trace is a full snapshot or deletion of the UVE on 'Y' ("YES" branch of 310), analytics engine 285 may update snapshot 'Y' with data of received object 'X' (311). That is, for a full snapshot, analytics engine 285 may replace snapshot 'Y' with the new contents from the object trace. Alternatively, for deletion, analytics engine 285 may remove snapshot 'Y.' In either case, analytics engine 285 may update a sequence number for snapshot 'Y' of Object X. Furthermore, analytics engine 285 may build an aggregated state of object 'X' for tier 'Z' (315). This may involve iterating over all snapshots for Object X and doing appropriate calculations (e.g., taking a sum of values, a union of sets, or the like), to generate aggregate data for Object X. Analytics engine 285 may then display the aggregated state for Object X.

On the other hand, when the object trace is not a full snapshot or deletion ("NO" branch of 310), analytics engine 285 may determine whether there was a gap in sequence numbers for data of the object with key 'X' in instance 'Y' (316). If analytics engine 285 determines that there is such a gap ("YES" branch of 316), analytics engine 285 may request, for instance 'Y' in tier 'Z', a full snapshot of UVE 'X' (317). In this manner, in response to detecting a gap in the sequence numbers for a process of a tier, analytics engine 285 may send instructions to the device that is executing the process to replay a current state for the UVE.

Alternatively, when there is not such a gap ("NO" branch of 316), analytics engine 285 may update snapshot 'Y' of object 'X' (318). This may include, for atomic types of attributes associated with object X, replacing values of the atomic types with new values of the new snapshot. For add or delete notification container types, analytics engine 285 may add, delete, or modify a local copy of the container. For all cases, analytics engine 285 may update the sequence number for snapshot 'Y' of object 'X.' Furthermore, analytics engine 285 may build an aggregated state of object 'X' for tier 'Z' (315). This may involve iterating over all snapshots for Object X and doing appropriate calculations (e.g., taking a sum of values, a union of sets, or the like), to generate aggregate data for Object X. Analytics engine 285 may then display the aggregated state for Object X.

Figure 10:
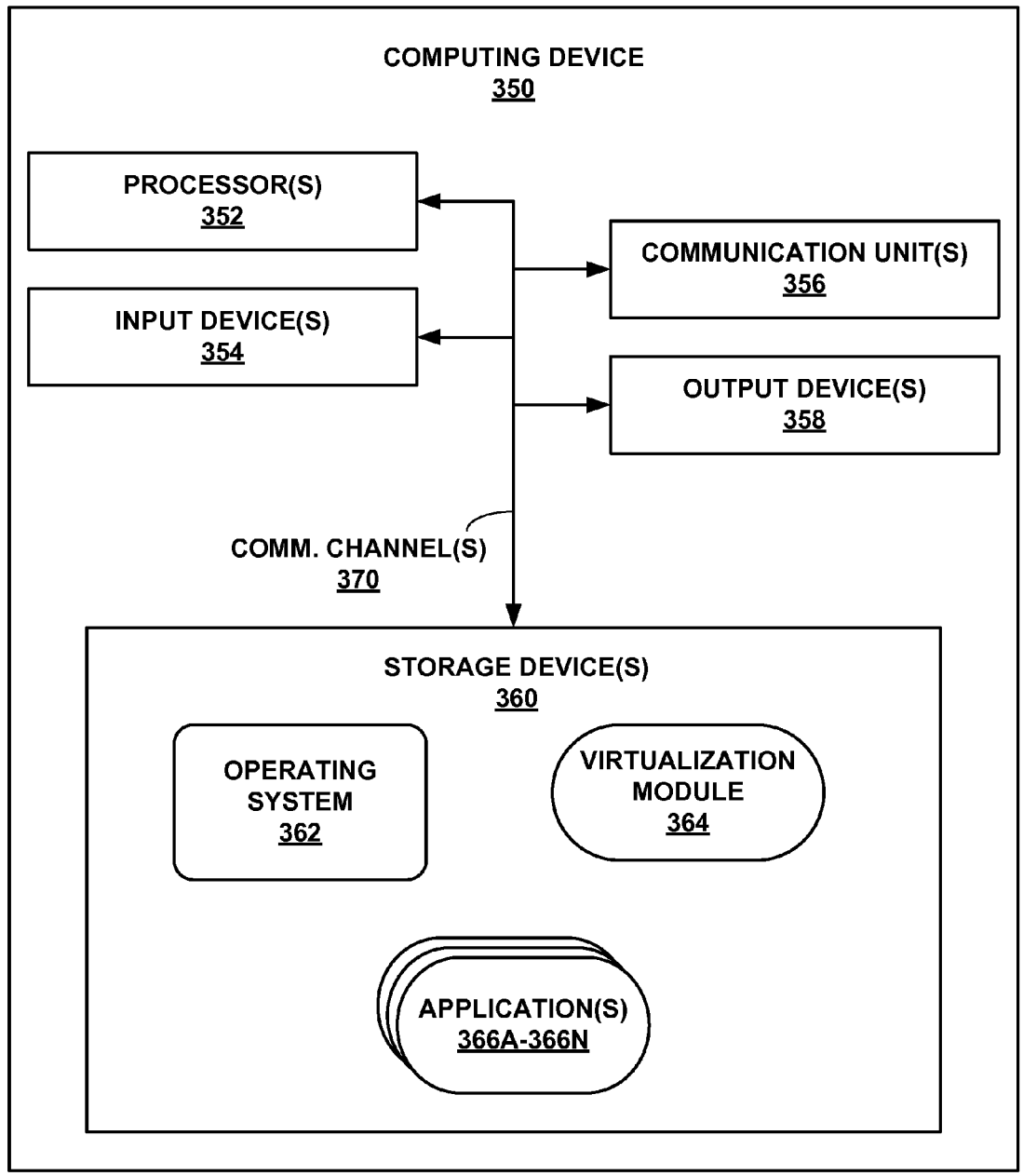
FIG. 10 is a block diagram illustrating an example computing device for aggregating data of various processes, in accordance with one or more techniques of this disclosure.

FIG. 10 is a block diagram illustrating an example computing device 350 for aggregating data of various processes, in accordance with one or more techniques of this disclosure. FIG. 10 illustrates only one particular example of computing device 350, and many other examples of computing device 350 may be used in other instances. Computing device 350 may correspond to a virtual network controller. That is, virtual network controllers 22, 100 may include components substantially similar to those illustrated in FIG. 10. Similarly, analytics engine 285 of FIG. 8 may include components substantially similar to those illustrated in FIG. 10. Computing device 350 may be configured to perform any of the various techniques described in this disclosure, e.g., the method of FIG. 9.

As shown in the specific example of FIG. 10, computing device 350 includes one or more processors 352, one or more communication units 356, one or more input devices 354, one or more output devices 358, and one or more storage devices 360. Computing device 350, in the specific example of FIG. 10, further includes operating system 362, virtualization module 364, and one or more applications 366A-366N (collectively "applications 366"). Each of components 352, 356, 354, 358, and 360 may be interconnected (physically, communicatively, and/or operatively) for inter-component communications. As one example in FIG. 10, components 352, 356, 354, 358, and 360 may be coupled by one or more communication channels 370. In some examples, communication channels 370 may include a system bus, network connection, interprocess communication data structure, or any other channel for communicating data. Virtualization module 364 and applications 366, as well as operating system 362 may also communicate information with one another as well as with other components in computing device 350.

Processors 352, in one example, are configured to implement functionality and/or process instructions for execution within computing device 350. For example, processors 352 may be capable of processing instructions stored in storage devices 360. Examples of processors 352 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 360 may be configured to store information within computing device 350 during operation. Storage devices 360, in some examples, are described as a computer-readable storage medium. In some examples, storage devices 360 are a temporary memory, meaning that a primary purpose of storage devices 360 is not long-term storage. Storage devices 360, in some examples, are described as a volatile memory, meaning that storage devices 360 do not maintain stored contents when the computer is turned off. Examples of volatile memories include random access memories (RAM), dynamic random access memories (DRAM), static random access memories (SRAM), and other forms of volatile memories known in the art. In some examples, storage devices 360 are used to store program instructions for execution by processors 352. Storage devices 360, in one example, are used by software or applications running on computing device 350 (e.g., operating system 362, virtualization module 364 and the like) to temporarily store information during program execution.

Storage devices 360, in some examples, also include one or more computer-readable storage media. Storage devices 360 may be configured to store larger amounts of information than volatile memory. Storage devices 360 may further be configured for long-term storage of information. In some examples, storage devices 360 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 350, in some examples, also includes one or more communication units 356. Communication units 356 represent examples of network interfaces for communicating with external devices, e.g., devices of an SDN that execute various processes, e.g., processes conforming to various tiers, as discussed above. Computing device 350, in one example, utilizes communication units 356 to communicate with external devices. Communication units 356 may communicate, in some examples, by sending data packets over one or more networks, such as one or more wireless networks, via inbound and outbound links. Communication units 356 may include one or more network interface cards (IFCs), such as an Ethernet card, an optical transceiver, a radio frequency transceiver, or any other type of device that can send and receive information. Other examples of such network interfaces may include Bluetooth, 3G and WiFi radio components. In some examples, computing device 350 utilizes communication units 356 to receive data regarding processes executed by external devices, which processors 352 may aggregate in accordance with the techniques of this disclosure.

Computing device 350, in one example, also includes one or more input devices 354. Input devices 354, in some examples, are configured to receive input from a user through tactile, audio, or video feedback. Examples of input devices 354 include a presence-sensitive display, a mouse, a keyboard, a voice responsive system, video camera, microphone or any other type of device for detecting a command from a user. In some examples, a presence-sensitive display includes a touch-sensitive screen.

One or more output devices 358 may also be included in computing device 350. Output devices 358, in some examples, are configured to provide output to a user using tactile, audio, or video stimuli. Output devices 358, in one example, include a presence-sensitive display, a sound card, a video graphics adapter card, or any other type of device for converting a signal into an appropriate form understandable to humans or machines. Additional examples of output devices 358 include a speaker, a cathode ray tube (CRT) monitor, a liquid crystal display (LCD), or any other type of device that can generate intelligible output to a user.

Computing device 350 may include operating system 364. Operating system 364, in some examples, controls the operation of components of computing device 350. For example, operating system 364, in one example, facilitates the communication of modules applications 366 with processors 352, communication units 356, input devices 354, output devices 358, and storage devices 362. Applications 366 may each include program instructions and/or data that are executable by computing device 350. As one example, application 366A may include instructions that cause computing device 350 to perform one or more of the operations and actions described in the present disclosure.

In accordance with techniques of the present disclosure, computing device 350 may be configured to aggregate data for a set of two or more related processes, to form aggregated data for the set of two or more related processes. In particular, computing device 350 may determine the set of two or more related processes executed by respective devices in a virtual network, and receive data for the set of two or more related processes. In general, the set of processes may correspond to a common "tier," e.g., a common network plane, and each of the processes in a particular set may be substantially similar.

More particularly, in accordance with the techniques of this disclosure, computing devices communicatively coupled to computing device 350 via communication units 356, and processes executed by the computing devices, may be divided into various tiers. Within each tier there may be a set of related (e.g., substantially similar) processes. Furthermore, computing device 350 may define User-Visible Entities (UVEs) for the various tiers. The UVEs may define various data for monitoring processes of the various tiers. For example, the UVEs may define attributes of processes to retrieve. Computing device 350 may receive data output during execution of the processes, and in accordance with the UVEs, extract values for the attributes defined by the UVEs. Computing device 350 may further aggregate this data. For example, the UVE may define a manner in which to aggregate certain types of data, corresponding to the attributes, such as addition, union over sets, concatenation, list generation, or the like.

Computing device 350 may then generate one or more reports that are indicative of a tier and aggregated values for one or more attributes corresponding to the tier, as defined by a corresponding UVE. This aggregation can be performed transparently to the devices executing the processes. That is, the devices executing the processes need not take any part in the aggregation. An administrator may use the generated report to diagnose various aspects of the virtual network. For example, the report may include data indicative of one or more of a quantitative failure, a fault parameter, a memory failure, a telecommunications failure, a processor failure, a packet resend, and/or a dropped communication session. The administrator may determine, using the report, whether any or all of these conditions apply and act accordingly, e.g., by reprogramming a device communicatively coupled to computing device 350 via communication units 356, adding, replacing, or removing links between devices, adding or upgrading software for one or more devices, or the like, based on the contents of the report.

In some examples, computing device 350 includes an analytics layer, that is, an intermediate layer that acts on generic rules. The UVEs may define rules in accordance with the analytics layer. Thus, computing device 350 may operate substantially automatically, that is, without user interference, to perform the techniques of this disclosure. The analytics tier may use definitions of the UVEs to extract information from communications output by the devices executing the corresponding processes and aggregate values for certain attributes, as defined by the UVEs, of the communications.

In this manner, computing device 350 represents an example of a controller device configured to determine, for a virtual network, a set of two or more related processes executed by respective devices in the virtual network, receive data for the set of two or more related processes, and aggregate the data for the set of two or more related processes to form aggregated data for the set of two or more related processes.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

The techniques of this disclosure may also be embodied in transitory storage media, such as signals and carrier waves. Such media are generally referred to as communications media. Thus, computer-readable media generally may correspond to (1) tangible, computer-readable storage media that is non-transitory, or (2) a communication medium such as a signal or carrier wave. Communication media, such as signals and carrier waves, are considered transitory, and hence, not considered non-transitory.

Various examples have been described. These and other examples are within the scope of the following claims.

What is claimed is:

1. A method comprising:
    determining, by a controller device for a virtual network, a set of two or more related processes executed by respective devices in the virtual network, the related processes including a first process executed by a first device of a plurality of devices that form a physical network and a second, related process executed by a second, different device of the plurality of devices, wherein the virtual network comprises an overlay network formed over the physical network and between virtual switches executed by the plurality of devices including a first virtual switch executed by the first device and a second virtual switch executed by the second device, and wherein determining the set of two or more related processes comprises forming the set to include processes that perform similar operations on different instances of respective data;
    receiving, by the controller device, data for the set of two or more related processes from the respective devices;
    aggregating, by the controller device, the data for the set of two or more related processes to form aggregated data for the set of two or more related processes; and
    detecting, by the controller device, a fault in the virtual network from the aggregated data.

2. The method of claim 1, further comprising presenting the aggregated data to a user.

3. The method of claim 1, wherein the aggregated data comprises data for a User-Visible Entity (UVE).

4. The method of claim 3, wherein the UVE defines one or more attributes for which values are to be extracted from the received data for the set of two or more related processes, and wherein aggregating comprises:
    extracting values for the one or more attributes defined by the UVE; and
    aggregating the values for the one or more attributes.

5. The method of claim 4, wherein the UVE defines the one or more attributes for a tier in which the set of two or more related processes are executed.

6. The method of claim 5, wherein the tier comprises a respective service plane.

7. The method of claim 5, wherein the tier comprises one of a plurality of tiers, and wherein each of the plurality of tiers is associated with a respective UVE.

8. The method of claim 7, wherein the plurality of tiers include one or more of a control plane tier, an analytics tier, a configuration tier, and a software defined network (SDN) forwarding tier.

9. The method of claim 7, wherein the UVE comprises a UVE for the SDN forwarding tier, and wherein the UVE defines a bytes received attribute and a virtual machine names attribute.

10. The method of claim 7, wherein the plurality of tiers are arranged in a hierarchical fashion.

11. The method of claim 7, wherein each of the tiers includes a respective set of processes, and wherein each of the processes for a common one of the tiers is substantially similar.

12. The method of claim 7, further comprising:
for each of the tiers, determining resources of the virtual network used by the respective UVEs; and
automatically determining whether the resources for one of the UVEs are insufficient based on a number of repeated failures associated with the one of the UVEs.

13. The method of claim 7, further comprising:
for each of the UVEs, in response to detecting a failure of a component associated with the UVE, logically associating the failed component with values for one or more of the attributes associated with the UVE that preceded the failure of the component.

14. The method of claim 5, wherein the UVE defines a respective aggregation method for each of the attributes, wherein the respective aggregation methods comprise one of addition, union over sets, concatenation, and list formation.

15. The method of claim 3, wherein the UVE corresponds to a virtual network including the respective devices that execute the set of two or more processes.

16. The method of claim 3, further comprising:
analyzing sequence numbers of packets of the received data for the UVE; and
in response to detecting a gap in the sequence numbers for one of the processes, sending instructions to the device that is executing the one of the processes to replay a current state for the UVE.

17. The method of claim 3, further comprising generating a report including the aggregated data, wherein the report is associated with the UVE.

18. The method of claim 17, wherein the report includes data indicative of one or more of a quantitative failure, a fault parameter, a memory failure, a telecommunications failure, a processor failure, a packet resend, and a dropped communication session, the method further comprising forwarding the report and an identifier for the UVE to a centralized, queryable database.

19. A controller device comprising:
one or more network interfaces communicatively coupled to one or more devices of a virtual network; and
a processor configured to:
determine, for the virtual network, a set of two or more related processes executed by respective devices in the virtual network, the related processes including a first process executed by a first device of a plurality of devices that form a physical network and a second, related process executed by a second, different device of the plurality of devices, wherein the virtual network comprises an overlay network formed over the physical network and between virtual switches executed by the plurality of devices including a first virtual switch executed by the first device and a second virtual switch executed by the second device, and wherein determining the set of two or more related processes comprises forming the set to include processes that perform similar operations on different instances of respective data,
receive via the network interfaces data for the set of two or more related processes,
aggregate the data for the set of two or more related processes to form aggregated data for the set of two or more related processes, and
detect a fault in the virtual network from the aggregated data.

20. A computer-readable storage medium having stored thereon instructions that, when executed, cause a processor to:
determine, by a controller device for a virtual network, a set of two or more related processes executed by respective devices in the virtual network, the related processes including a first process executed by a first device of a plurality of devices that form a physical network and a second, related process executed by a second, different device of the plurality of devices, wherein the virtual network comprises an overlay network formed over the physical network and between virtual switches executed by the plurality of devices including a first virtual switch executed by the first device and a second virtual switch executed by the second device, and wherein determining the set of two or more related processes comprises forming the set to include processes that perform similar operations on different instances of respective data;
receive, by the controller device, data for the set of two or more related processes;
aggregate, by the controller device, the data for the set of two or more related processes to form aggregated data for the set of two or more related processes; and
detect a fault in the virtual network from the aggregated data.

* * * * *